US012576733B2

(12) United States Patent
Haghbin

(10) Patent No.: US 12,576,733 B2
(45) Date of Patent: Mar. 17, 2026

(54) VEHICLE ELECTRICAL SYSTEM

(71) Applicants: Ningbo Geely Automobile Research & Development Co., Ltd., Ningbo (CN); Zhejiang Geely Holding Group Co., Ltd., Zhejiang (CN)

(72) Inventor: Saeid Haghbin, Öjersjö (SE)

(73) Assignees: ZHEJIANG GEELY HOLDING GROUP CO., LTD., Zhejiang (CN); Ningbo Geely Automobile Research & Dev. Co., Ltd., Ningbo (CN)

( * ) Notice: Subject to any disclaimer, the term of this patent is extended or adjusted under 35 U.S.C. 154(b) by 932 days.

(21) Appl. No.: 17/853,448

(22) Filed: Jun. 29, 2022

(65) Prior Publication Data

US 2022/0324340 A1    Oct. 13, 2022

Related U.S. Application Data

(63) Continuation of application No. PCT/CN2021/075305, filed on Feb. 4, 2021.

(30) Foreign Application Priority Data

Feb. 13, 2020    (EP) .................................... 20157083

(51) Int. Cl.
*B60L 53/22*        (2019.01)
*B60L 53/14*        (2019.01)
        (Continued)

(52) U.S. Cl.
CPC .............. *B60L 53/14* (2019.02); *B60L 53/22* (2019.02); *B60L 53/24* (2019.02); *H02J 7/007* (2013.01);
        (Continued)

(58) Field of Classification Search
CPC .................................. B60L 53/22; B60L 53/14
        (Continued)

(56) References Cited

U.S. PATENT DOCUMENTS

2002/0070557 A1    6/2002    Geis
2008/0094013 A1    4/2008    Su
        (Continued)

FOREIGN PATENT DOCUMENTS

CN        103434415 A    12/2013
CN        106031016 A    10/2016
        (Continued)

OTHER PUBLICATIONS

International Search Report from International Application No. PCT/CN2021/075305, dated Apr. 29, 2021, 2 pages.

*Primary Examiner* — Ahmed H Omar
(74) *Attorney, Agent, or Firm* — Tucker Ellis LLP

(57) ABSTRACT

A vehicle electrical system includes: an electrical storage system, a first multiphase electrical machine having stator windings, and a first inverter connected to the electrical storage system and the first multiphase electrical machine, the first inverter has a plurality of switch legs with switches; a second multiphase electrical machine having stator windings, and a second inverter connected to the electrical storage system and the second multiphase electrical machine, the second inverter has a plurality of switch legs with switches; and a terminal having poles that receive single-phase AC or multi-phase AC or DC from a vehicle charging source, a first line connects a first pole of the terminal with a first switch leg of the first inverter, a second conductive line connects a second pole of the terminal with a first switch leg of the second inverter, and a first inductor in the first or second conductive lines.

17 Claims, 8 Drawing Sheets

(51) Int. Cl.
    *B60L 53/24*        (2019.01)
    *H02J 7/00*        (2006.01)
    *H02J 7/02*        (2016.01)

(52) U.S. Cl.
    CPC ............. *H02J 7/02* (2013.01); *B60L 2210/40*
           (2013.01); *B60L 2220/40* (2013.01)

(58) Field of Classification Search
    USPC ........................................................ 320/104
    See application file for complete search history.

(56)            References Cited

U.S. PATENT DOCUMENTS

| | | | |
|---|---|---|---|
| 2009/0096394 A1 | 4/2009 | Taniguchi | |
| 2009/0301801 A1 | 12/2009 | Fujitake | |
| 2010/0013438 A1 | 1/2010 | Anwar | |
| 2010/0019734 A1* | 1/2010 | Oyobe ................... | B60K 6/445 |
| | | | 320/162 |
| 2010/0268406 A1 | 10/2010 | Ito | |
| 2013/0234665 A1 | 9/2013 | Januschevski | |
| 2014/0132203 A1 | 5/2014 | Schillinger | |
| 2015/0231978 A1* | 8/2015 | Danner ..................... | H02J 7/00 |
| | | | 307/10.1 |
| 2018/0029486 A1 | 2/2018 | Pfeilschifter | |

FOREIGN PATENT DOCUMENTS

| | | |
|---|---|---|
| DE | 102018009848 A1 | 6/2019 |
| GB | 2531039 A | 4/2016 |
| WO | 10119097 A2 | 10/2010 |
| WO | 2011089563 A2 | 7/2011 |
| WO | 19071360 A1 | 4/2019 |

* cited by examiner

VEHICLE ELECTRICAL SYSTEM

RELATED APPLICATION DATA

This application is a continuation of International Patent Application No. PCT/CN2021/075305, filed Feb. 4, 2021, which claims the benefit of European Patent Application No. 20157083.5, filed Feb. 13, 2020, the disclosures of which are incorporated herein by reference in their entireties.

TECHNICAL FIELD

The present disclosure relates to a vehicle electrical system and to a method for charging an electrical storage system of a vehicle electrical system.

The vehicle electrical system and associated method according to the disclosure can be implemented in a vehicle, such as an electric car or a hybrid electric car. However, the vehicle electrical system and associated method according to the disclosure is not restricted to this particular vehicle, but may alternatively be installed or implemented in another type of vehicle, such as a truck, a bus, a rail vehicle, a flying vehicle, a marine vessel, an off-road vehicle, a mining vehicle, an agriculture vehicle, a working vehicle such as a wheel loader or excavator, a forest vehicle such as harvesters or forwarders, a motorcycle or the like.

BACKGROUND

In the field of vehicle electrical systems, in particular electrical systems for plug-in electrical vehicles, there is a continuous demand for further improved performance, operating lifetime and cost-efficiency.

For example, document US 2015/0231978 A1 discloses an electric system for charging a battery of a plug-in vehicle having dual electrical motors and dual inverters, wherein the inverters are used for charging the battery and wherein charging current is made to alternate between the first and second motors for preventing motor rotation during charge transfer.

However, despite the activities in the field, there is still a demand for a further improved vehicle electrical system, in particular in terms of improved performance, operating lifetime and cost-efficiency.

SUMMARY

An object of the present disclosure is to provide a vehicle electrical system and method for charging an electrical storage system of a vehicle electrical system, where the previously mentioned problems are avoided. This object is at least partly achieved by the features of the independent claims.

According to a first aspect of the present disclosure, there is provided a vehicle electrical system comprising an electrical storage system, a first multiphase electrical machine having a plurality of stator windings, a first inverter connected to the electrical storage system and to the first multiphase electrical machine, wherein the first inverter has a plurality of switch legs with switches, a second multiphase electrical machine having a plurality of stator windings, a second inverter connected to the electrical storage system and to the second multiphase electrical machine, wherein the second inverter has a plurality of switch legs with switches, a terminal having a plurality of poles and configured for receiving single-phase AC or multi-phase AC or DC from a vehicle external charging source, a first conductive line connecting a first pole of the terminal with a first switch leg of the first inverter, a second conductive line connecting a second pole of the terminal with a first switch leg of the second inverter, a first inductor arranged in one of the first and second conductive line, and a control system operatively coupled to the first and second inverters and configured for controlling operation of the switches of the first and second inverters for preventing charging current from passing through any of the stator windings of the first and second multiphase electrical machines during transfer of electrical charge from the vehicle external charging source to the electrical storage system.

According to a second aspect of the present disclosure, there is provided a method for charging an electrical storage system of a vehicle electrical system. The method comprises the steps of connecting a first inverter to a first multiphase electrical machine having a plurality of stator windings and to the electrical storage system, wherein the first inverter has a plurality of switch legs with switches, connecting a second inverter to a second multiphase electrical machine having a plurality of stator windings and to the electrical storage system, wherein the second inverter has a plurality of switch legs with switches, connecting a first pole of a terminal with a first switch leg of the first inverter via a first conductive line, connecting a second pole of the terminal with a first switch leg of the second inverter via a second conductive line, providing a first inductor in one of the first and second conductive lines, connecting the terminal having a plurality of poles to a vehicle external charging source configured for supplying single-phase AC or multi-phase AC or DC, and controlling operation of the switches of the first and second inverters for preventing charging current from passing through any of the stator windings of the first and second multiphase electrical machines during transfer of electrical charge from the vehicle external charging source to the electrical storage system.

In this way, i.e. by controlling operation of the switches of the inverters for preventing charging current from passing through the stator windings of the electrical machines during charging, the risk for motor movement, motor vibration, energy losses and toque ripple caused by current flow through the stator windings is eliminated or at least further reduced, thereby reducing noise, vibration or even motion of the motor/vehicle. Moreover, by relying on an inductor provided in the first or second conductive line, operation of the electrical system in a step-up mode, i.e. a boost mode, or step-down mode, i.e. buck mode, is simplified because an appropriate and sufficiently large inductance in henry (H) of the buck/boost circuit inductor can be easily obtained by merely selecting an appropriate inductor element, such as a coil, and install this in the first and/or second conductive line. Moreover, the size of the inductor can also be selected independent on the stator winding design of the electric machines. Hence, electrical machines with relatively small inductance may be used in the vehicle electric circuit without negative effect on filtering, step-up and/or step-down operating performance. Finally, the dual use of the existing inverters, i.e. both for conventional control of the speed and/or torque of the associated electrical machine, as well as for serving as rectifiers of AC charging current during charging of the electrical storage system, enables a more cost-efficient design, because the use of a separate on-board charger with integrated rectifier may be omitted.

Further advantages are achieved by implementing one or several of the features of the dependent claims.

In some example embodiments, when the control system is configured for charging the electrical storage system using electrical energy supplied from the vehicle external charging source in a voltage step-up mode, the control system is configured to operate a first switch of the first switch leg of the first inverter with alternating on and off periods, such that a charging current during an on-period flows from the vehicle external charging source, through the first conductive line, the first switch of the first switch leg of the first inverter, an intrinsic or extrinsic reverse diode associated with a first switch of the first switch leg of the second inverter, the second conductive line, the first inductor, and back to the vehicle external charging source, while bypassing the electrical storage system, and such that a charging current during an off-period flows from a negative pole of the electrical storage system, through the intrinsic or extrinsic reverse diode associated with the first switch of the first switch leg of the second inverter, the second conductive line, the first inductor, the vehicle external charging source, the first conductive line, an intrinsic or extrinsic reverse diode associated with a second switch of the first switch leg of the first inverter, to a positive pole of the electrical storage system. Operation of the vehicle electrical system in a voltage step-up mode makes the system more flexible in terms of charging voltage level.

In some example embodiments, when the vehicle external charging source is AC for charging the electrical storage system in a voltage step-up mode, the control system selectively controls operation of the first switch leg of the first inverter and the first switch leg of the second inverter, such that electric current flow alternates between: flowing through the first switch of the first switch leg of the first inverter for charging the electrical storage system during a first supply voltage polarity state, and flowing through the first switch of the first switch leg of the second inverter for charging the electrical storage system during a second supply voltage polarity state. Hence, both the positive and negative polarity phase of an AC supply may be used for efficient charging of the vehicle electrical system.

In some example embodiments, the vehicle electrical system further comprises a first supply switch arranged in one of the first and second conductive lines and configured for selectively opening and closing said first or second conductive line, and a step-down switch operatively connected to the first and second conductive lines and configured for selectively opening and closing a connection between said first or second conductive lines, wherein the first supply switch, the step-down switch and the first inductor are arranged to allow current flow between a portion of the first conductive line and a portion of the second conductive line via the step-down switch and the first inductor when the first supply switch is in an open state. The possibility of operating the vehicle electrical system in a voltage step-down mode makes the system more flexible in terms of charging voltage level.

In some example embodiments, the control system is operatively coupled to the first supply switch and the step-down switch and configured for controlling operation thereof. A certain level of joint control of the inverters, the supply switch and the step-down switch is typically required. Hence, by having the control system controlling operation of also the supply switch and the step-down switch, a more cost-efficient system is accomplished.

In some example embodiments, when the control system is configured for charging the electrical storage system using electrical energy supplied from the vehicle external charging source in a voltage step-down mode, the control system is configured to operate the first supply switch and the step-down switch synchronized and with alternating on and off periods. Thereby, a straight-forward and easily implemented step-down solution is accomplished, that also can be implemented without changing or customizing the inverters and/or electrical machines.

In some example embodiments, when the control system is configured for charging the electrical storage system using electrical energy supplied from the vehicle external charging source in a voltage step-down mode, the control system is configured to set the first supply switch in a closed state when the step-down switch is set in an open state, and oppositely. Thereby, a straight-forward and easily implemented step-down solution is accomplished, that also can be implemented without changing or customizing the inverters and/or electrical machines.

In some example embodiments, when the control system is configured for charging the electrical storage system using electrical energy supplied from the vehicle external charging source in a voltage step-down mode, the control system is configured to keep all switches of the first and second inverters in an open state. Thereby, a straight-forward and easily implemented step-down solution is accomplished, that also can be implemented without changing or customizing the inverters and/or electrical machines.

In some example embodiments, when the control system is configured for charging the electrical storage system using electrical energy supplied from the vehicle external charging source in a voltage step-down mode, the control system is configured to operate the first supply switch and the step-down switch, such that a charging current during an on-period of the supply switch flows from a negative pole of the electrical storage system, through the intrinsic or extrinsic reverse diode associated with a first switch of the first switch leg of the second inverter, the second conductive line, the first inductor, the vehicle external charging source, the first conductive line, an intrinsic or extrinsic reverse diode associated with a second switch of the first switch leg of the first inverter, and to a positive pole of the electrical storage system. Thereby, a straight-forward and easily implemented step-down solution is accomplished, that also can be implemented without changing or customizing the design or structure of the inverters and/or electrical machines.

In some example embodiments, when the control system is configured for charging the electrical storage system using electrical energy supplied from the vehicle external charging source in a voltage step-down mode, the control system is configured to operate the first supply switch and the step-down switch, such that a charging current during an on-period of the step-down switch flows from a negative pole of the electrical storage system, through the intrinsic or extrinsic reverse diode associated with a first switch of the first switch leg of the second inverter, the second conductive line, the first inductor, the step-down switch, the first conductive line, an intrinsic or extrinsic reverse diode associated with a second switch of the first switch leg of the first inverter, and to a positive pole of the electrical storage system. Thereby, a straight-forward and easily implemented step-down solution is accomplished, that also can be implemented without changing or customizing the design or structure of the inverters and/or electrical machines.

In some example embodiments, when the control system is configured for charging the electrical storage system using AC electrical energy supplied from the vehicle external charging source in a voltage step-down mode, the control system is configured to operate the first supply switch and the step-down switch, such that a charging current alternates between: flowing through the intrinsic or extrinsic reverse diode associated with a second switch of the first switch leg of the first inverter and an intrinsic or extrinsic reverse diode associated with a first switch of the first switch leg of the second inverter for charging the electrical storage system during a first supply voltage polarity state; and flowing through the intrinsic or extrinsic reverse diode associated with a second switch of the first switch leg of the second inverter and an intrinsic or extrinsic reverse diode associated with a first switch of the first switch leg of the first inverter for charging the electrical storage system during a second supply voltage polarity state. Thereby, a straight-forward and easily implemented step-down solution is accomplished, that also can be implemented without changing or customizing the design or structure of the inverters and/or electrical machines.

In some example embodiments, when the control system is configured for charging the electrical storage system using electrical energy supplied from the vehicle external charging source in a voltage step-up mode, the control system is configured for controlling operation of the switches of the first and second inverters by operating a first switch of the first switch leg of the first inverter with alternating on and off periods, while the other switches of the first and second inverters are controlled to remain in the open state for preventing charging current from passing through any of the stator windings of the first and second multiphase electrical machines.

In some example embodiments, when the control system is configured for charging the electrical storage system using electrical energy supplied from the vehicle external charging source in a voltage step-down mode, the control system is configured for controlling operation of the switches of the first and second inverters by keeping all switches of the first and second inverters in an open state for preventing charging current from passing through any of the stator windings of the first and second multiphase electrical machines.

In some example embodiments, the vehicle electrical system further comprises a third multiphase electrical machine having a plurality of stator windings, a third inverter connected to the electrical storage system and to the third multiphase electrical machine, wherein the third inverter has a plurality of switch legs with switches, a third conductive line connecting a third pole of the terminal with a first switch leg of the third inverter, a second inductor arranged in the second conductive line, a third inductor arranged in the third conductive line, wherein the first inductor is arranged in the first conductive line, and wherein the control system operatively coupled to each of the first, second and third inverters and configured for controlling operation of the switches of the first, second and third inverters for preventing charging current from passing through any of the stator windings of the first, second and third multiphase electrical machines during three-phase charging of the electrical storage system from the vehicle external charging source. Three-phase AC for charging of the electrical storage system generally enables significantly faster and more powerful charging than single phase AC charging.

In some example embodiments, the first supply switch and the step-down switch are located on a common circuit board separate from the first and second inverters. Thereby, a more economical implementation of the vehicle electrical system may accomplished, because there is no or only little need for modifying the inverters and/or electrical machines.

In some example embodiments, the terminal is configured for receiving single-phase AC from the vehicle external charging source, wherein the vehicle electrical system comprises a first supply switch arranged in the first conductive line and configured for selectively opening and closing said first conductive line, and a second supply switch arranged in the second conductive line and configured for selectively opening and closing said second conductive line. Two supply switches, one for the phase line and one for the neutral line of the single phase AC, provides more safety against unintentional short circuiting or the like.

Alternatively, in some example embodiments, the terminal is configured for receiving three-phase AC from the vehicle external charging source, wherein the vehicle electrical system comprises a first supply switch arranged in the first conductive line and configured for selectively opening and closing said first conductive line, a second supply switch arranged in the second conductive line and configured for selectively opening and closing said second conductive line, and a third supply switch arranged in the third conductive line and configured for selectively opening and closing said third conductive line. Three supply switches, one for each phase of a three-phase AC supply provides more safety against unintentional short circuiting or the like.

In some example embodiments, the first conductive line is attached to the first switch leg or to a conductive line connecting the first switch leg with a stator winding of the first multiphase electrical machine, and the second conductive line is attached to the second switch leg or to a conductive line connecting the second switch leg with a stator winding of the second multiphase electrical machine.

In some example embodiments, the first conductive line is connected to the first inverter, or the first multiphase electrical machine, or an intermediate element operatively connecting the first inverter with the first multiphase electrical machine, such that a charging current supplied via the first conductive line may reach the first inverter without passing through a stator winding of the first multiphase electrical machine, and wherein the second conductive line is connected to the second inverter, or the second multiphase electrical machine, or an intermediate element operatively connecting the second inverter with the second multiphase electrical machine, such that a charging current supplied via the second conductive line may reach the second inverter without passing through a stator winding of the second multiphase electrical machine.

In some example embodiments, the first inductor is an individual element separate from the first and second multiphase electrical machines.

In some example embodiments, the first conductive line is configured for being connected to a phase line of a single phase AC supply, and the second conductive line is configured for being connected to a neutral line of the single phase AC supply.

In some example embodiments, the method further comprises, when charging the electrical storage system using electrical energy supplied from the vehicle external charging source in a voltage step-up mode, operating a first switch of the first switch leg of the first inverter with alternating on and off periods, such that a charging current during an on-period flows from the vehicle external charging source, through the first conductive line, the first switch of the first switch leg of the first inverter, an intrinsic or extrinsic reverse diode associated with a first switch of the first switch leg of the second inverter, the second conductive line, the first inductor, and back to the vehicle external charging source, while bypassing the electrical storage system, and such that a charging current during an off-period flows from a negative pole of the electrical storage system, through the intrinsic or extrinsic reverse diode associated with the first switch of the first switch leg of the second inverter, the second conductive line, the first inductor, the vehicle external charging source, the first conductive line, an intrinsic or extrinsic reverse diode associated with a second switch of the first switch leg of the first inverter, to a positive pole of the electrical storage system. Operation of the vehicle electrical system in a step-up mode provides a more flexible system with a wider field of application.

In some example embodiments, the method further comprises: providing a first supply switch in one of the first and second conductive lines and configured for selectively opening and closing said first or second conductive line, and providing a step-down switch operatively connected to the first and second conductive lines and configured for selectively opening and closing a connection between said first or second conductive line, wherein the first supply switch, the step-down switch and the first inductor are arranged to allow current flow between the first and second conductive lines via the step-down switch and the first inductor when the first supply switch is in an open state. Operation of the vehicle electrical system in a step-down mode provides a more flexible system with a wider field of application.

In some example embodiments, the method further comprises charging the electrical storage system using electrical energy supplied from the vehicle external charging source in a voltage step-down mode by operating the first supply switch and the step-down switch, such that a charging current during an on-period of the supply switch flows from a negative pole of the electrical storage system, through the intrinsic or extrinsic reverse diode associated with a first switch of the first switch leg of the second inverter, the second conductive line, the first inductor, the vehicle external charging source, the first conductive line, an intrinsic or extrinsic reverse diode associated with a second switch of the first switch leg of the first inverter, and to a positive pole of the electrical storage system, and such that a charging current during an on-period of the step-down switch flows from a negative pole of the electrical storage system, through the intrinsic or extrinsic reverse diode associated with a first switch of the first switch leg of the second inverter, the second conductive line, the first inductor, the step-down switch, the first conductive line, an intrinsic or extrinsic reverse diode associated with a second switch of the first switch leg of the first inverter, and to a positive pole of the electrical storage system. Operation of the vehicle electrical system in a step-down mode provides a more flexible system with a wider field of application.

In some example embodiments, the method further comprises charging the electrical storage system using electrical energy supplied from the vehicle external charging source in a voltage step-down mode by operating the first supply switch and the step-down switch synchronized and with alternating on and off periods. Operation of the vehicle electrical system in a step-down mode provides a more flexible system with a wider field of application.

In some example embodiments, the method further comprises charging the electrical storage system using electrical energy supplied from the vehicle external charging source in a voltage step-down mode by alternately setting the first supply switch in a closed state when the step-down switch is set in an open state, and oppositely. Operation of the vehicle electrical system in a step-down mode provides a more flexible system with a wider field of application.

In some example embodiments, the method further comprises charging the electrical storage system using electrical energy supplied from the vehicle external charging source in a voltage step-down mode by keeping all switches of the first and second inverters in an open state. Operation of the vehicle electrical system in a step-down mode provides a more flexible system with a wider field of application.

In some example embodiments, the method further comprising supplying single phase AC from the vehicle external charging source, and controlling operation of the first supply switch and the step-down switch, such that a charging current in a voltage step-down mode alternates between: flowing through the intrinsic or extrinsic reverse diode associated with a second switch of the first switch leg of the first inverter and an intrinsic or extrinsic reverse diode associated with a first switch of the first switch leg of the second inverter for charging the electrical storage system during a first supply voltage polarity state; and flowing through the intrinsic or extrinsic reverse diode associated with a second switch of the first switch leg of the second inverter and an intrinsic or extrinsic reverse diode associated with a first switch of the first switch leg of the first inverter for charging the electrical storage system during a second supply voltage polarity state. Operation of the vehicle electrical system in a step-down mode provides a more flexible system with a wider field of application.

In some example embodiments, the method further comprises charging the electrical storage system using electrical energy supplied from the vehicle external charging source in a voltage step-up mode, controlling operation of the switches of the first and second inverters by operating a first switch of the first switch leg of the first inverter with alternating on and off periods, while the other switches of the first and second inverters are controlled to remain in the open state for preventing charging current from passing through any of the stator windings of the first and second multiphase electrical machines.

In some example embodiments, the method further comprises charging the electrical storage system using electrical energy supplied from the vehicle external charging source in a voltage step-down mode, controlling operation of the switches of the first and second inverters by keeping all switches of the first and second inverters in an open state for preventing charging current from passing through any of the stator windings of the first and second multiphase electrical machines.

In some example embodiments, the method further comprises: connecting a third inverter to a third multiphase electrical machine having a plurality of stator windings and to the electrical storage system, wherein the third inverter has a plurality of switch legs with switches, connecting a third pole of a terminal with a first switch leg of the third inverter via a third conductive line, providing the first inductor in the first conductive line, providing a second inductor in the second conductive line, providing a third inductor in the third conductive line, connecting the terminal having a plurality of poles to a vehicle external charging source configured for supplying three-phase AC, and controlling operation of the switches of the first, second and third inverters for preventing charging current from passing through any of the stator windings of the first, second and third multiphase electrical machines during transfer of electrical charge from the vehicle external charging source to the electrical storage system.

Three-phase charging supply generally results in significantly increased charging speed and reduced load on individual cables and fuses of the supply grid.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF THE DRAWINGS

The disclosure will be described in detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

The vehicle electrical system according to the present disclosure is configured for being implemented in a hybrid electric vehicle or a full electric vehicle, such as a car.

Figure 1:
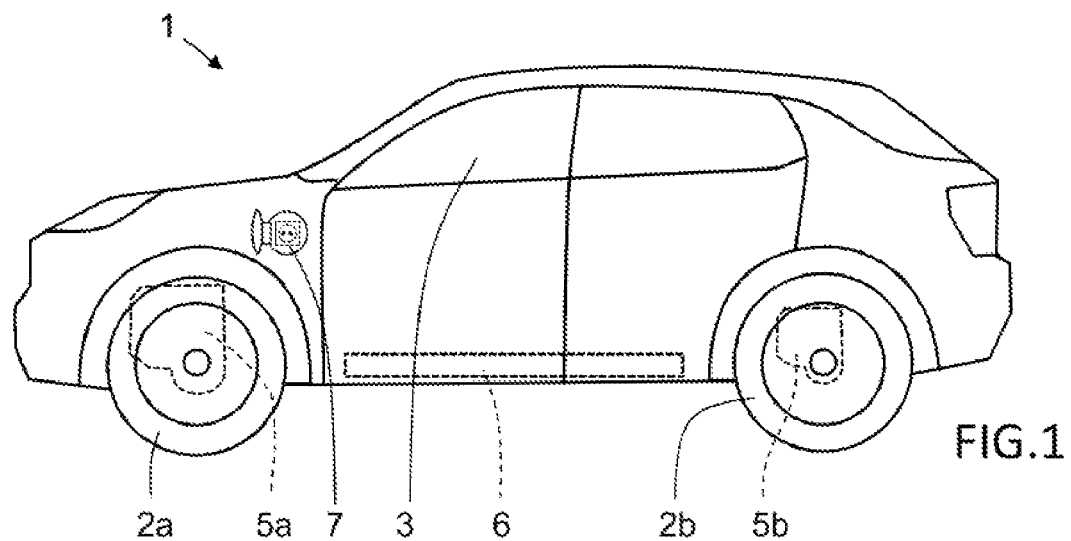
FIG. 1 shows schematically a side view of a plug-in vehicle.

FIG. 1 schematically shows a side-view of an example type of vehicle 1 that may be implemented with the vehicle electrical system. The electrical vehicle 1 is here illustrated in form of a car having front wheels 2a, rear wheels 2b, a passenger compartment 3, luggage compartment 4 and a vehicle powertrain including at least two electrical propulsion motors 5a, 5b, such as two multi-phase AC motors or two DC motors.

The vehicle powertrain 5 further comprises an electrical storage system 6, such as for example a battery or a combination of battery and a capacitor, for vehicle propulsion. If the electrical vehicle is a plug-in vehicle, i.e. being configured for charging of the electrical storage system by electrical energy from an external grid, the vehicle may additionally include for example a terminal 7 configured for receiving an external charging connector for charging of the electrical storage system. The terminal 7 may advantageously be accessible from the outside of the vehicle 1.

The vehicle powertrain 5 may additionally include for example a combustion engine or a fuel cell.

In conventional solutions, an individual and separate On-board Charger (OBC) is typically used for charging the electrical storage system of the vehicle. A conventional OBC is typically connected to a terminal for connection with the grid, and to the electrical storage system for charging the electrical storage system with power from the grid during for example vehicle parking. The OBC typically includes a rectifier for providing AC/DC conversion of the supplied single phase AC before charging the electrical storage system with DC. However, with the electrical system according to the present disclosure, the OBC may be omitted and the first and second inverters, which are normally merely used for powering the electrical machines 5a, 5b and vehicle braking regeneration, are here provided with dual functionality by using the first and second inverters 9a, 9b also for charging of the electrical storage system 6 using electrical energy from the grid, i.e. from the vehicle external charging source.

Figure 2:
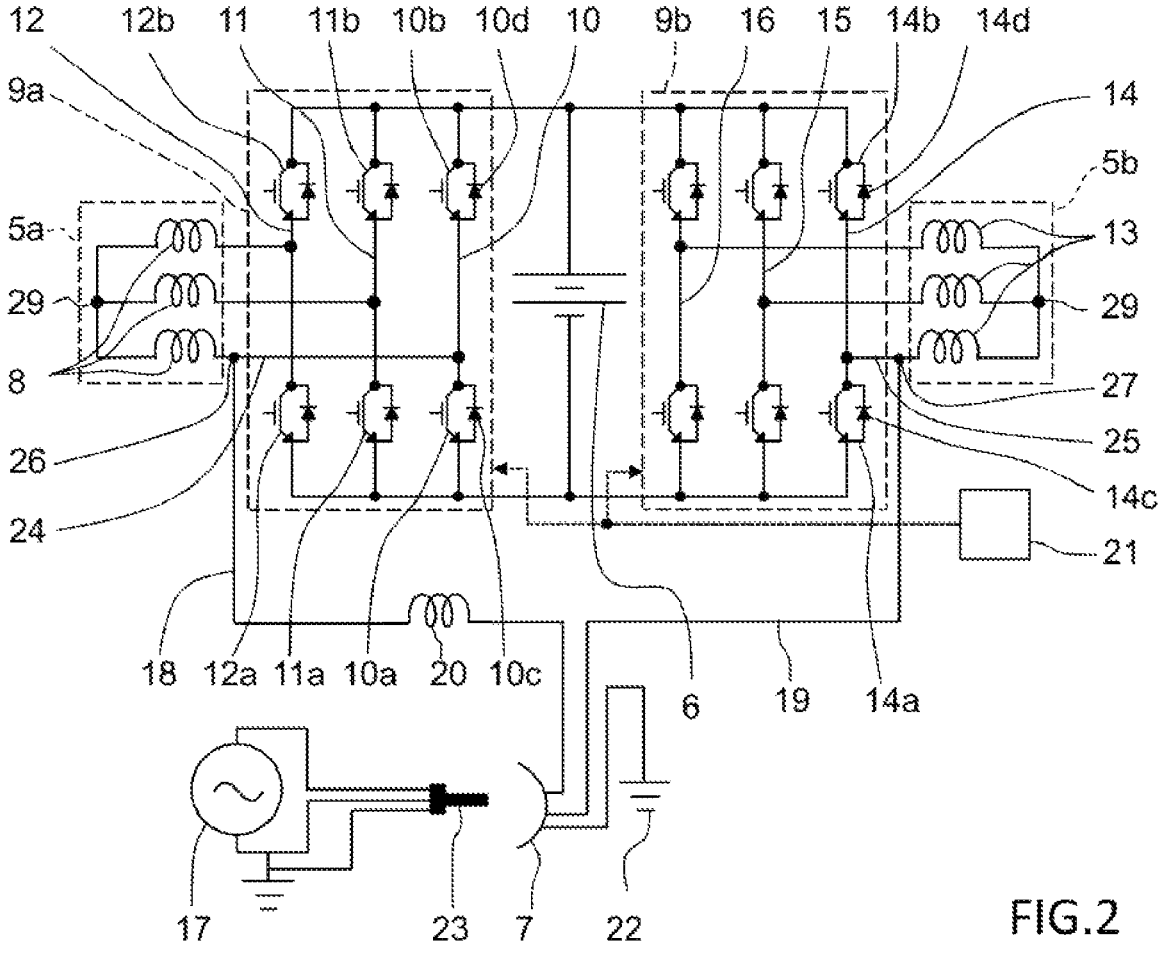
FIG. 2 shows schematically a first example embodiment of the vehicle electrical system according to the disclosure.

Consequently, with reference to FIG. 2, which shows a first example embodiment of the vehicle electrical system according to the disclosure, the vehicle electrical system may comprise a vehicle on-board electrical storage system 6, a first multiphase electrical machine 5a having a plurality of stator windings 8, a first inverter 9a connected to the electrical storage system 6 and to the first multiphase electrical machine 5a, wherein the first inverter 9a has a plurality of switch legs 10, 11, 12 with switches 10a, 10b, 11a, 11b, 12a, 12b.

The vehicle electrical system further comprises a second multiphase electrical machine 5b having a plurality of stator windings 13, a second inverter 9b connected to the electrical storage system 6 and to the second multiphase electrical machine 5b, wherein the second inverter 9b has a plurality of switch legs 14, 15, 16 with switches 14a, 14b.

The vehicle electrical system further comprises a terminal 7 having a plurality of poles and configured for receiving single-phase AC or multi-phase AC or DC from a vehicle external charging source 17, a first conductive line 18 connecting a first pole of the terminal 7 with a first switch leg 10 of the first inverter 9a, a second conductive line 19 connecting a second pole of the terminal 7 with a first switch leg 14 of the second inverter 9b, and a first inductor 20 arranged in one of the first and second conductive lines 18, 19.

The vehicle electrical system additionally comprises a control system 21 operatively coupled to the first and second inverters 9a, 9b and configured for controlling operation of the switches of the first and second inverters 9a, 9b for preventing a charging current from passing through any of the stator windings 8, 13 of the first and second multiphase electrical machines 5a, 5b during transfer of electrical charge from the vehicle external charging source 17 to the electrical storage system 6.

The first inductor 20 is thus an individual element separate from the first and second multiphase electrical machines 5a, 5b.

The electrical storage system 6 may include a high-voltage battery composed of for example lithium-ion battery cells, lithium-sulphur battery cells, or solid-state battery cells, or the like. The high-voltage battery may for example have a rated voltage level in the range of 100V-1500V. The battery capacity in terms of kWh depends on factors such as whether the vehicle is a hybrid vehicle having an additional power source, such as a combustion engine, or whether the vehicle is a pure electric vehicle, and the desired operating range, etc. The capacity may for example be about 10-150 kWh.

However, in certain applications such as for example of so called "mild hybrid" systems, the electrical storage system

6 may include a battery nominal output voltage of for example about of 24V-59V, in particular 24V or 48V.

The first and second multiphase electrical machines 5a, 5b may for example be three-phase, five-phase, or seven-phase electrical machines, or the like. A three-phase electrical machine may for example have three stator windings, each divided in two halves that are arranged on opposite sides in the stator. The three stator windings may then be disposed 120 degrees apart from each other, and each stator winding may then be deemed having two magnetic poles, i.e. a three-phase two-pole electrical machine. However, the stator windings may alternatively be distributed into four sections, wherein each section is displaced 90 degrees apart from each other. Such a stator winding is deemed having four poles, i.e. a three-phase four-pole electrical machine. Other stator winding arrangements are possible, such as six-pole arrangement, or the like.

The first and second electrical machines 5a, 5b may for example be permanent magnet synchronous motors or AC induction motors or switched reluctance motors.

In the example embodiment described with reference to FIG. 2, each of the first and second inverters 9a, 9b has three switch legs, i.e. a first switch leg 10, 14, and second switch leg 11, 15 and a third switch leg 12, 16, all connected in parallel. Each of the switch legs 10, 11, 12, 14, 15, 16 of the first and second inverters 9a, 9b is supplied with DC from the electrical storage system 6 and the control system may then control the switches to execute appropriate switching operation of the inverter switches 10a, 10b, 11a, 11b, 12a, 12b, 14a, 14b for providing a phase-shifted output voltage to the stator windings 8, 13 of first and second electrical machines 5a, 5b that has more or less a three-phase sinusoidal operating characteristic.

Each switch leg 10, 11, 12, 14, 15, 16 may have two switches, e.g. a first switch 10a, 11a, 12a, 14a and a second switch 10b, 11b, 12b, 14b. A first stator winding 8, 13 of the first and second electrical machines 5a, 5b, may be connected to the first switch leg 10 14, between the first and second switches 10a, 10b, 14a, 14b of the first and second inverter 9a, 9b, respectively. Similarly, a second stator winding 8, 13 of the first and second electrical machines 5a, 5b, may be connected to the second switch leg 11, 15, between the first and second switches 11a, 11b of the first and second inverters 9a, 9b, respectively. Finally, a third stator winding 8, 13 of the first and second electrical machines 5a, 5b, may be connected to the third switch leg 12, 14, between the first and second switches 12a, 12b of the first and second inverters 9a, 9b, respectively.

However, other inverter designs are possible within the scope of the present application.

The switches 10a, 10b, 11a, 11b, 12a, 12b, 14a, 14b may for example be power transistors for controlling torque and/or speed of the first and second multiphase electrical machine. For example, the switches may be Insulated Gate Bipolar Transistor (IGBTs) or MOSFETs.

Each of the switches 10a, 10b, 11a, 11b, 12a, 12b, 14a, 14b of the first and second inverters 9a, 9b is provided with a parallel-connected reverse diode 10c 10d, 14c, 14d, also known as freewheeling diode, body diode or snubber diode. The reverse diode may for example be an intrinsic diode, i.e. a reverse diode functionality. For example, MOSTFET types transistors typically include intrinsic reverse diode functionality due to their design and structure. However, some IGBTs generally do not have such intrinsic reverse diodes and may then instead be provided with an extrinsic reverse diode, i.e. physically individual diode separate from the transistor, connected in parallel with the transistor. Moreover, also MOSFET transistors may be provided with an extrinsic reverse diode. Reverse diodes are needed for avoiding that large negative voltage may build up over the transistor when switching an inductive load, because an inductive load typically generate a large negative voltage during negative current changes, thereby potentially destroying the transistor.

The terminal 7 may for example have three poles, e.g. phase pole, neutral pole and earth pole, as schematically illustrated in FIG. 2, for supplying single phase AC to the vehicle. For example, the first conductive line 18 may be connected to a phase pole of the terminal 7, and the second conductive line 19 may be connected to the neutral pole of the terminal 7. Some additional poles for communication between the vehicle external charging source 17 and vehicle electrical system may be provided. The earth pole may be connected to an earth point 22 of the vehicle, such as the metal chassis or the like. Alternately, the terminal 7 may for example have five poles, e.g. first phase pole, second phase pole, third phase pole, neutral pole and earth pole.

The first and second conductive lines 18, 19 for connecting the terminal 7 with the first and seconds inverters 9a, 9b may be composed of a single conductor or a plurality of interconnected conductors.

The control system 21 may for example be composed of a single electronic control unit (ECU), as schematically illustrated in FIG. 2, or alternatively be composed of a distributed control system having a plurality of interconnected control units, such as for example a first inverter control unit and a second inverter control unit, each inverter control unit being controlled by a common powertrain control unit.

The control unit 21 is configured for controlling operation of the switches 10a, 10b, 11a, 11b, 12a, 12b, 14a, 14b of the first and second inverters 9a, 9b for preventing a charging current from passing through any of the stator windings 8, 13 of the first and second multiphase electrical machines 5a, 5b during transfer of electrical charge from the vehicle external charging source 17 to the electrical storage system 6. This is accomplished by appropriate opening and closing of the first switch 10a, 14a of each first leg 10, 14, i.e. the switching leg 10, 14 that is connected to the first and second conductive lines 18, 19.

Although the control unit 21 is configured for controlling operation of said switches 10a, 10b, 11a, 11b, 12a, 12b, 14a, 14b for preventing said charging current from passing through any of said stator windings 8, 13, in certain operating conditions a relatively small charging current may nevertheless in fact pass through some of said stator windings 8, 13. For example, during time periods of actual charging of the electrical storage system, i.e. when all said switches 10a, 10b, 11a, 11b, 12a, 12b, 14a, 14b of the inverters 9a, 9b are in an open state and the charging current delivered by the first or second conductive lines 18, 19 primarily passes through the reverse diodes 10d, 14c, 14d, 10c of the of the first switch legs 10, 14, a minor current may possibly simultaneously, depending on polarity, flow through the first or second conductive line 18, 19 and pass through the stator windings of the first or second electrical machine 5a, 5b and through the reverse diodes of the of the second and/or third switch legs of the inverters 9a, 9b. However, this minor current is typically significantly smaller due to the impedance of said stator windings, and is therefore herein deemed virtually non-existing.

Hence, by connecting one pole of a DC supply or a single phase AC supply to a first switch leg of a first inverter, and connecting the other pole of the DC supply or a single phase AC supply to a first switch leg of a second inverter, wherein both said first and second inverters are connected to a common on-board electrical storage system, charging of said common on-board electrical storage system may be accomplished without charging current passing through the stator windings of the first and second electrical machines, while using the inverters for both driving the electrical motors and for charging of the on-board electrical storage system.

As described above, the first conductive line 18 connects the terminal 7 with the first switch leg 10 of the first inverter 9*a*, and the second conductive line 19 connects the terminal 7 with the first switch leg 14 of the second inverter 9*b*. In particular, the first conductive line 18 connects the terminal 7 with the first switch leg 10 of the first inverter 9*a* at a location between the first and second switches 10*a*, 10*b* of the first switch leg 10 of the first inverter 9*a*, and the second conductive line 19 connects the terminal 7 with the first switch leg 14 of the second inverter 9*b* at a location between the first and second switches 14*a*, 14*b* of the first switch leg 14 of the second inverter 9*b*.

Moreover, the first and second conductive lines 18, 19 may be attached to directly to said first switch legs 10, 14, respectively, or indirectly via another conductor. In other words, the first conductive line 18 may be attached to the first switch leg 10 of the first inverter 9*a* or to a first conductive line 24 connecting the first switch leg 10 with a stator winding 8 of the first multiphase electrical machine 5*a*, and the second conductive line 19 may be attached to the first switch leg 14 of the second inverter 9*b* or to a second conductive line 25 connecting the first switch leg 14 with a stator winding 13 of the second multiphase electrical machine 5*b*.

In other words, the first conductive line 24 may be deemed corresponding to an intermediate element operatively connecting the first switch leg 10 of the first inverter 9*a* with a stator winding 8 of the first multiphase electrical machine 5*a*, and the second conductive line 25 may be deemed corresponding to an intermediate element operatively connecting a first switch leg 14 of the second inverter 9*b* with a stator winding 13 of the second multiphase electrical machine.

Furthermore, the first conductive line 18 may be attached to said first switch leg 10 or said first conductive line 24 at a first connection point 26 located outside of a casing of the first inverter 9*a* and outside of a casing of the first electrical motor 5*a*, because thereby conventional, off the shelf inverters, may be used, thereby avoiding the need for customized design and thus enabling reduced cost. The same applies to the second conductive line 19, which may be attached to said first switch leg 14 or said second conductive line 24 at a second connection point 27 located outside of a casing of the second inverter 9*b* and outside of a casing of the second electrical motor 5*b*.

The plurality of stator windings of each of the first and second electric motors 5*a*, 5*b* may for example be arranged in star connection having a common neutral point 29, as illustrated in FIG. 2, or in a delta connection, or the like.

The external charging connector 23 is connected to the vehicle external charging source 17, i.e. an external grid 17, such as single phase AC supply or DC supply.

By means of the first inductor 20 that is arranged in one of the first and second conductive lines 18, 19, a voltage step-up conversion of the supply voltage may be accomplished. This is for example useful when the voltage level of the electrical storage system is higher than a peak voltage of an AC supply, or higher than a DC supply voltage. For example, charging of a 400V battery by means of 230V or 120V AC grid supply is not possible without a voltage step-up conversion, also commonly referred to as boost conversion. Voltage step-up conversion is accomplished by means of the first inductor 20 in combination with appropriate switching control of the switches of the first and second inverters 9*a*, 9*b* in combination with for example appropriate pulse width modulation, or the like, for attaining the desired charging voltage level.

Operation of the vehicle electrical system in a voltage step-up mode when connected and supplied with single phase AC will be described below with reference to FIG. 3A, which shows the path of a charging current during a switch on-period in a first supply voltage polarity state, FIG. 3B, which shows the path of a charging current during a switch off-period in said first supply voltage polarity state, FIG. 3C, which shows the path of a charging current during a switch on-period in a second supply voltage polarity state, and FIG. 3D, which shows the path of a charging current during a switch off-period in said second supply voltage polarity state.

Figure 3A:
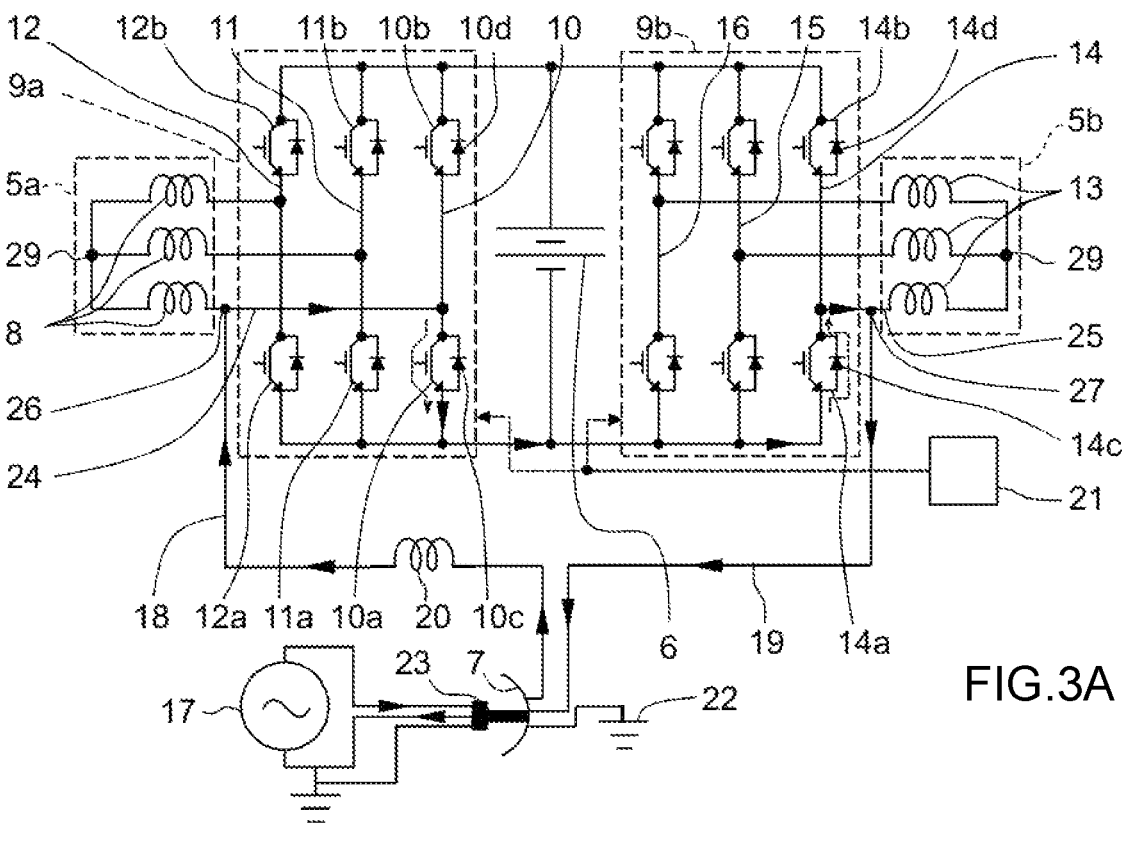
FIG. 3A-3D shows schematically the functionality of the vehicle electrical system of FIG. 2 in step-up mode for both polarities of a single phase AC supply.
Figure 3B:
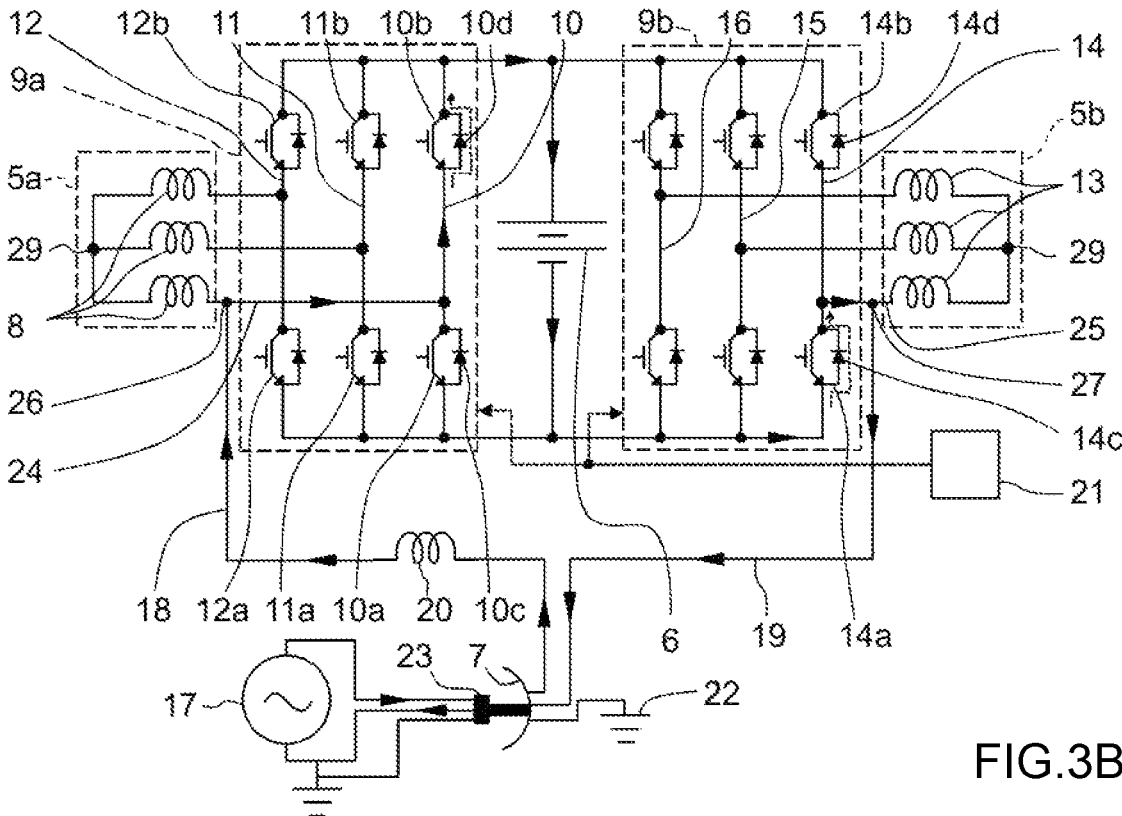

Specifically, with reference to FIGS. 3A and 3B, when the control system 21 is configured for charging the electrical storage system 6 using electrical energy supplied from the vehicle external charging source 17 in a voltage step-up mode, the control system 21 is configured to operate a first switch 10*a* of the first switch leg 10 of the first inverter 9*a* with alternating on and off periods, such that a charging current during an on-period of said first switch 10*a* flows from the vehicle external charging source 17, through the first conductive line 18 and an associated the first inductor 20, the first switch 10*a* of the first switch leg 10 of the first inverter 9*a*, an intrinsic or extrinsic reverse diode 14*c* associated with a first switch 14*a* of the first switch leg 14 of the second inverter 9*b*, the second conductive line 19, and back to the vehicle external charging source 17, while bypassing the electrical storage system 6.

The consecutive order of the electrical components listed above is not exhaustive and may be varied without departing from the disclosure as defined by the independent claims. For example, the first inductor may alternatively be arranged within the second conductive line 19. This applies for all embodiments described within the present disclosure.

During the on-period the first switch 10*a* is in a closed state, i.e. conductive state, resulting in an increase in the charging current flowing through the first inductor 20, such that energy starts to accumulate in said first inductor 20. In particular, as the current through the first inductor 20 is ramped up, an emf is generated, which acts to oppose the increase in the current. Hence, work must be performed against this emf by the vehicle external charging source 17 in order to establish the current in the first inductor 20. The accumulated energy of the first inductor 20 is actually stored in terms of a growing magnetic field generated by the current flowing through the first inductor 20.

During the subsequent off-period said first switch 10*a* is an open state, i.e. non-conductive state. As a result, the charging voltage from the vehicle external charging source 17 combines and collaborate with the stored energy in the first inductor 20, thereby increasing the total available charging voltage beyond the voltage level of the electrical storage system 6.

In particular, during the off-period, the first switch 10*a* is open and the only path offered to current generated by the first inductor 20 is through the reverse diode 10*d* of the second switch 10*b* of the first inverter 9*a* and the electrical storage system 6. This results in transferring the energy accumulated during the on-period back into the circuit and into the electrical storage system 6 when the current through the inductor 20 is ramped down, and its associated magnetic field collapses.

In other words, during the off-period, charging current flow from a negative pole of the electrical storage system 6, through the intrinsic or extrinsic reverse diode 14*c* associated with the first switch 14*a* of the first switch leg 14 of the second inverter 9*b*, the second conductive line 19, the vehicle external charging source 17, the first conductive line including the first inductor 20, an intrinsic or extrinsic reverse diode 10*d* associated with a second switch 10*b* of the first switch leg 10 of the first inverter 9*a*, and to a positive pole of the electrical storage system, thereby resulting in charging of the electrical storage system 6.

The ratio between on-period and a total period of the supply voltage polarity state, i.e. the fraction of the commutation period T during which the first switch is "on", is referred to duty cycle and ranges between 0 (first switch never on) and 1 (first switch always on). The control unit thus controls the pulse width modulation of the first switch 10*a*.

During operation in step-up mode, the charging voltage supplied to electrical storage system 6 is always higher than the input voltage at vehicle external charging source 17. Moreover, the level of the charging voltage supplied to electrical storage system 6 increases as the duty cycle goes from 0 to 1.

Clearly, the other switches of the first and second inverters 9*a*, 9*b* shall be controlled to remain in the open state during the step-up mode described above.

The operating condition of the vehicle electrical system described above with reference to FIGS. 3A and 3B apply for a first supply voltage polarity state of the single phase AC vehicle external charging source 17, i.e. during the short time period when the current flows in one direction of the alternating current supplied by the vehicle external charging source 17. This time period is for example 10 ms for a 50 Hz AC supply.

The operating condition of the vehicle electrical system during the subsequent short time period, when the single phase AC vehicle external charging source 17 operates is in a second supply voltage polarity state, i.e. during the short time period when the current flow temporarily has shifted direction and flows in the opposite direction, is described more in detail below with reference to FIGS. 3C and 3D.

Specifically, the control system 21 is configured for charging the electrical storage system 6 using electrical energy supplied from the vehicle external charging source 17 in the voltage step-up mode also during the subsequent second supply voltage polarity state.

Figure 3C:
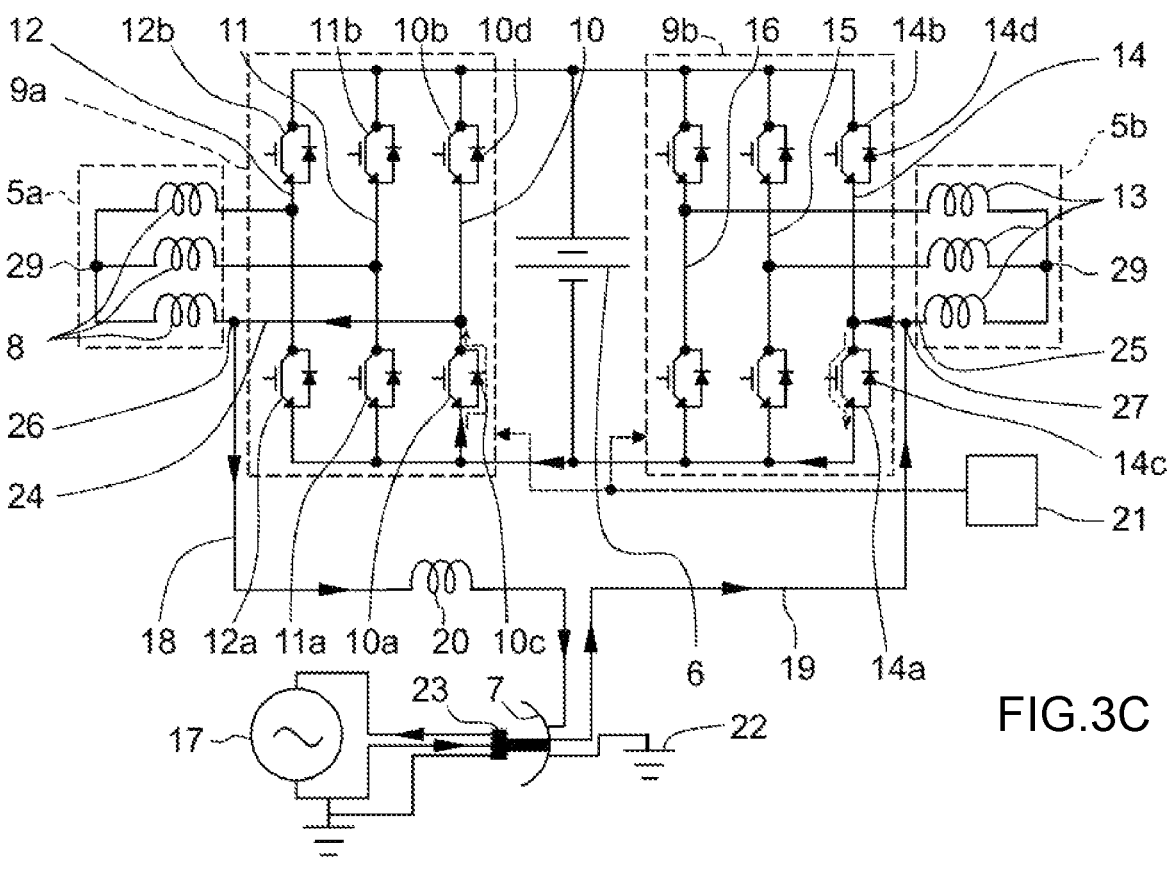

Consequently, the control system 21 is configured to operate the first switch 14*a* of the first switch leg 14 of the second inverter 9*b* with alternating on and off periods, such that a charging current during an on-period of said first switch 14*a* flows from the vehicle external charging source 17, through the second conductive line 19, the first switch 14*a* of the first switch leg 14 of the second inverter 9*b*, an intrinsic or extrinsic reverse diode 10*c* associated with a first switch 10*a* of the first switch leg 10 of the first inverter 9*a*, the first conductive line 18 and the associated first inductor 20, and back to the vehicle external charging source 17, while bypassing the electrical storage system 6, as illustrated in FIG. 3C.

By analogy, during said on-period of first switch 14*a* energy starts to accumulate in said first inductor 20, and upon opening of the first switch 14*a* at the beginning of the subsequent off-period, the current through the inductor 20 is ramped down and its associated magnetic field collapses to form a voltage source. The charging voltage from the vehicle external charging source 17 combines and collaborates with the stored energy in the first inductor 20, thereby increasing the total available charging voltage beyond the voltage level of the electrical storage system 6.

Since the first switch 14*a* is the open state during the off-period the only path offered for the combined charging current generated by the vehicle external charging source 17 the first inductor 20 is through the reverse diode 14*d* of the second switch 14*b* of the second inverter 9*b* and the electrical storage system 6. This results in transferring the energy accumulated during the on-period back into the circuit and into the electrical storage system 6.

Figure 3D:
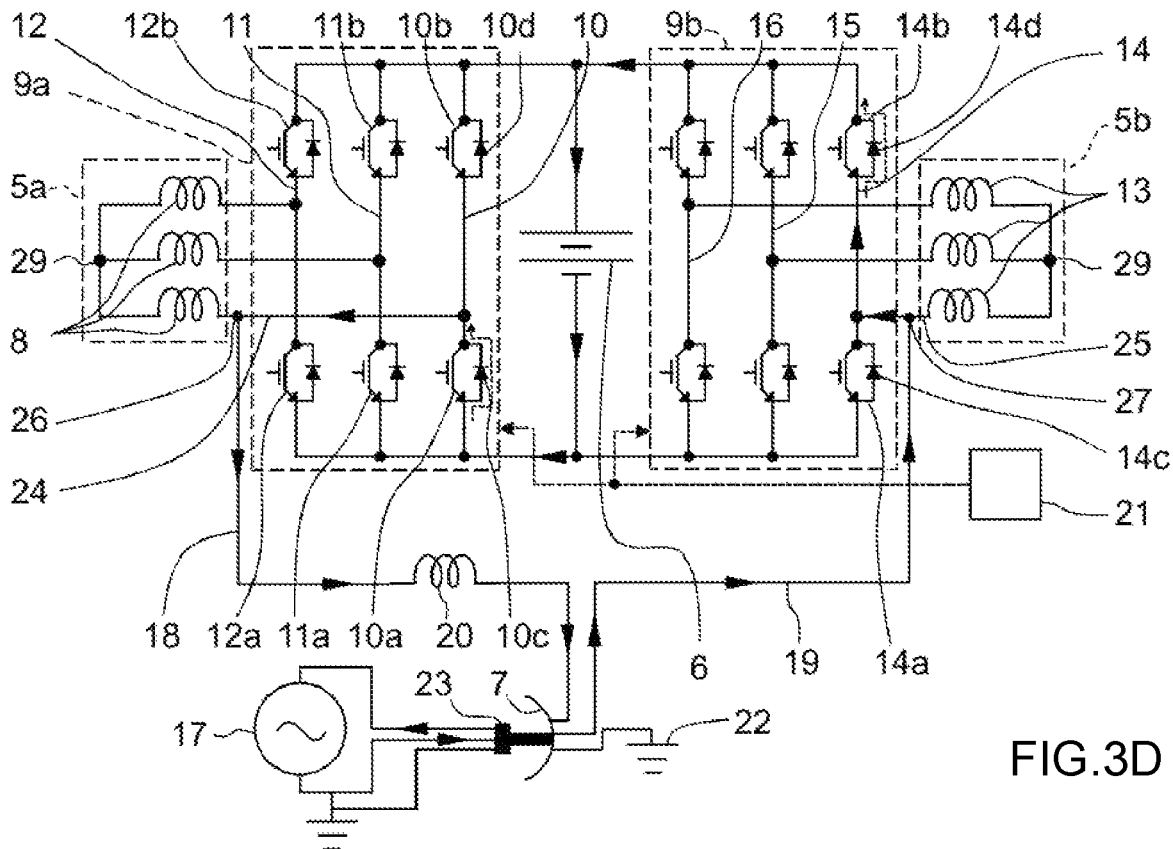

Hence, as illustrated in FIG. 3D, during the off-period, charging current will flow from the negative pole of the electrical storage system 6, through the intrinsic or extrinsic reverse diode 10*c* associated with the first switch 10*a* of the first switch leg 10 of the first inverter 9*a*, the first conductive line including the first inductor 20, the vehicle external charging source 17, the second conductive line 19, the intrinsic or extrinsic reverse diode 14*d* associated with a second switch 14*b* of the second switch leg 14 of the second inverter 9*b*, and to the positive pole of the electrical storage system 6, thereby resulting in charging of the electrical storage system 6.

Consequently, when the vehicle external charging source 17 is single phase AC for charging the electrical storage system in a voltage step-up mode, the control system 21 selectively controls operation of the first switch leg 10 of the first inverter 9*a* and the first switch leg 14 of the second inverter 9*b*, such that electric current flow alternates between: flowing through the first switch 10*a* of the first switch leg 10 of the first inverter 9*a* for charging the electrical storage system 6 during a first supply voltage polarity state, and flowing through the first switch 14*a* of the first switch leg 14 of the second inverter 9*b* for charging the electrical storage system 6 during a second supply voltage polarity state.

In certain applications or implementations of the vehicle electrical system, it may be desirable to not only step-up the supply voltage level but also to step-down the supply voltage level from the vehicle external charging source 17, also referred to a Buck-Boost conversion. For example, if the nominal voltage level of the electrical storage system is lower than a DC supply voltage level of a peak voltage level of an AC single phase, the voltage level must be stepped-down. Similarly, depending on operating temperature, charging level, age, type of charging or maintenance operation of the electrical storage system 6, or the like, the electrical storage system 6 may sometimes require a charging voltage level that is lower, and sometimes higher, than a DC supply voltage level of a peak voltage level of an AC single phase. A further example embodiment of the vehicle electrical system including such voltage step-up and voltage step-down capabilities will be described below with reference to FIGS. 4 and 5A-5D.

Figure 4:
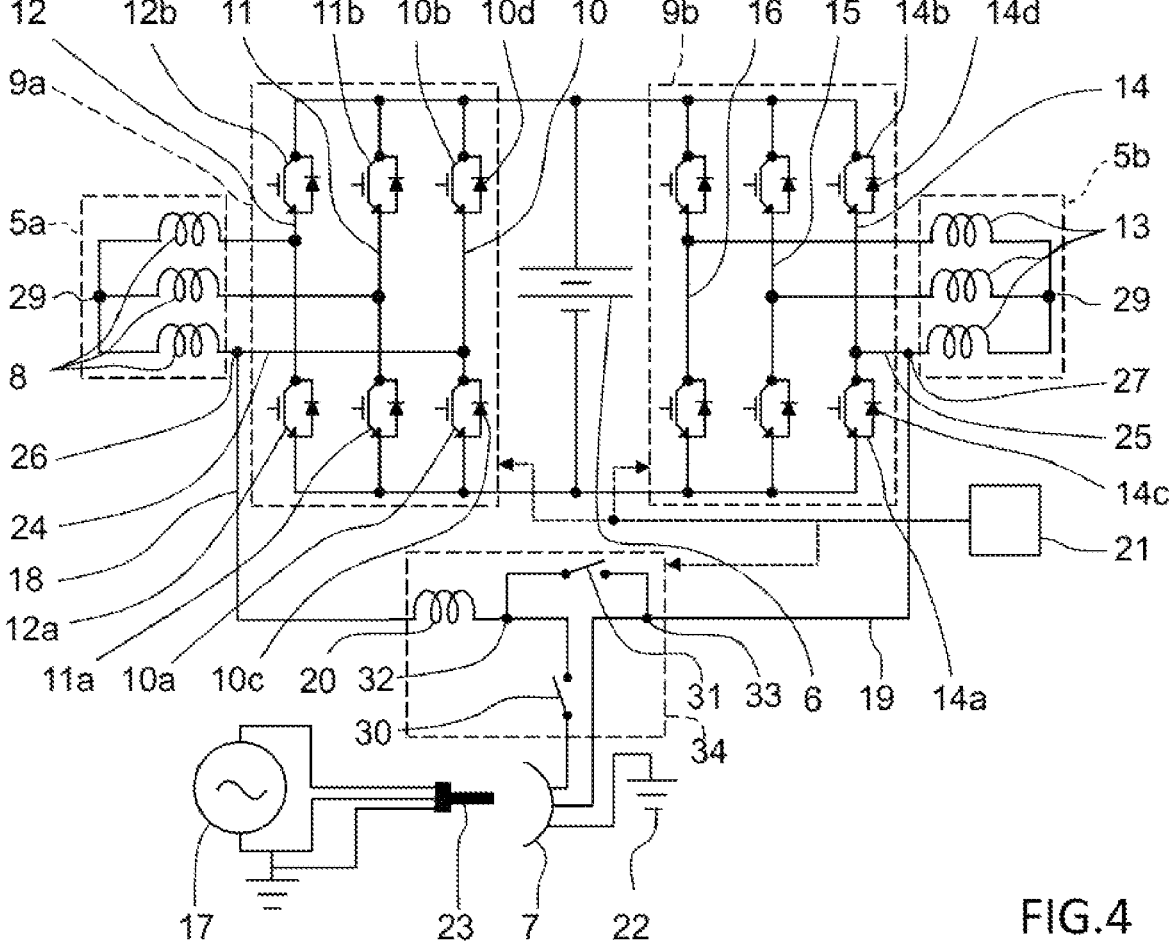
FIG. 4 shows schematically a further example embodiment of the vehicle electrical system according to the disclosure.

Specifically, the vehicle electrical system of FIG. 4 may have the same design and functionality as described above with reference to FIG. 2, but additionally comprising a first supply switch 30 arranged in one of the first and second conductive lines 18, 19 and configured for selectively opening and closing of a conductive path associated with said first or second conductive line 18, 19, and a step-down switch 31 operatively connected to the first and second conductive lines 18, 19 and configured for selectively opening and closing a connection between said first or second conductive lines 18, 19, wherein the first supply switch 30, the step-down switch 31 and the first inductor 20 are arranged to allow current flow between a portion of the first conductive line 18 and a portion of the second conductive line 19 via the step-down switch 31 and the first inductor 20 when the first supply switch 30 is in an open state.

In other words, the step-down switch 31 and the first inductor 20 are arranged to allow current flow between the first switch leg 10 of the first inverter 9*a* and the first switch leg 14 of the second inverter 9*b* via the first conductive line 18, the first inductor 20, the step-down switch 31 and the second conductive line 19, when the first supply switch 30 is in an open state.

Moreover, the first supply switch 30, the step-down switch 31 and the first inductor 20 are also arranged to allow current flow between the first switch leg 10 of the first inverter 9*a* and the first switch leg 14 of the second inverter 9*b* via the first conductive line 18, the first inductor 20, the first supply switch 30, the vehicle external charging source 17 and the second conductive line 19, when the step-down switch 31 is in an open state.

Thereby, voltage step-down conversion is accomplished by means of appropriate switching of the first supply switch 30 and step-down switch 31 for both DC supply and single phase AC supply from the vehicle external charging source 17.

The implementation the first supply switch 30, the step-down switch 31 and the first inductor 20 within the first and second conductive lines 18, 19 may be performed in various ways. For example, one terminal of the step-down switch 31 is connected to the first conductive line 18 at a first coupling point 32 and the other terminal of the step-down switch 31 is connected to the second conductive line 19 at a second coupling point 33. The first inductor 20 is arranged in the first conductive line 18 at a location between the first coupling point 32 and first switch leg 10 of the first inverter 9*a*, or in the second conductive line 19 at a location between the second coupling point 33 and the first switch leg 14 of the second inverter 9*b*. Moreover, the first supply switch 30 is arranged in the first conductive line 18 at a location between the first coupling point 32 and the terminal 7, or in the second conductive line 19 at a location between the second coupling point 33 and the terminal 7.

The control system 21 may be operatively coupled to the first supply switch 30 and step-down switch 31 and configured for controlling operation of said switches 30, 31.

The voltage step-up and step-down arrangement may be implemented using conventional, of the shelf inverters 9*a*, 9*b* and electrical machines 5*a*, 5*b*. It may thus be beneficial to arrange the first inductor 20, the first supply switch 30 and the step-down switch 31 on a common relatively small circuit board 34 separate from the first and second inverters 9*a*, 9*b* and from the first and second electrical machines 5*a*, 5*b*. Thereby, the desired operating functionality may be easily and cost-efficiently obtained in a modular approach, without need for dedicated or customized inverters 9*a*, 9*b* or electrical machines 5*a*, 5*b*.

The circuit board may additionally include a grid voltage monitoring part as well. The grid voltage may be continuously monitored for safety reasons and to insure unity power factor operation. It is also possible to identify if the peak value of the grid voltage is more or less than the desired charging voltage, and to control the charging process accordingly, for example by switching between voltage step-up and voltage step-down operation.

Furthermore, the disclosed vehicle electrical system may in fact due to the bidirectional structure of the charger and the vehicle electrical system also be used for vehicle to the grid operation, i.e. for transmitting electrical energy from the electrical storage system 6 of the vehicle to the vehicle external charging source 17, and thus to the grid, for powering electrical loads associated with the grid. Hence, the vehicle electrical system of the disclose enables usage of the electrical storage system 6 of the vehicle for responding to powered peaks of the grid. Hence, it is additionally possible to use the vehicle electrical system as an emergency power source for other stationary or non-stationary applications.

Operation of the vehicle electrical system described with reference to FIG. 4 in voltage step-up mode can be performed as described above with reference to FIGS. 3A-3D, while merely having the first supply switch 30 constantly in a closed state and the step-down switch 31 constantly in an open state. This corresponds to the circuit layout of FIG. 2. Hence, details with regard to operation of the vehicle electrical system of FIG. 4 in the voltage step-up mode will not be repeated here.

Figure 5A:
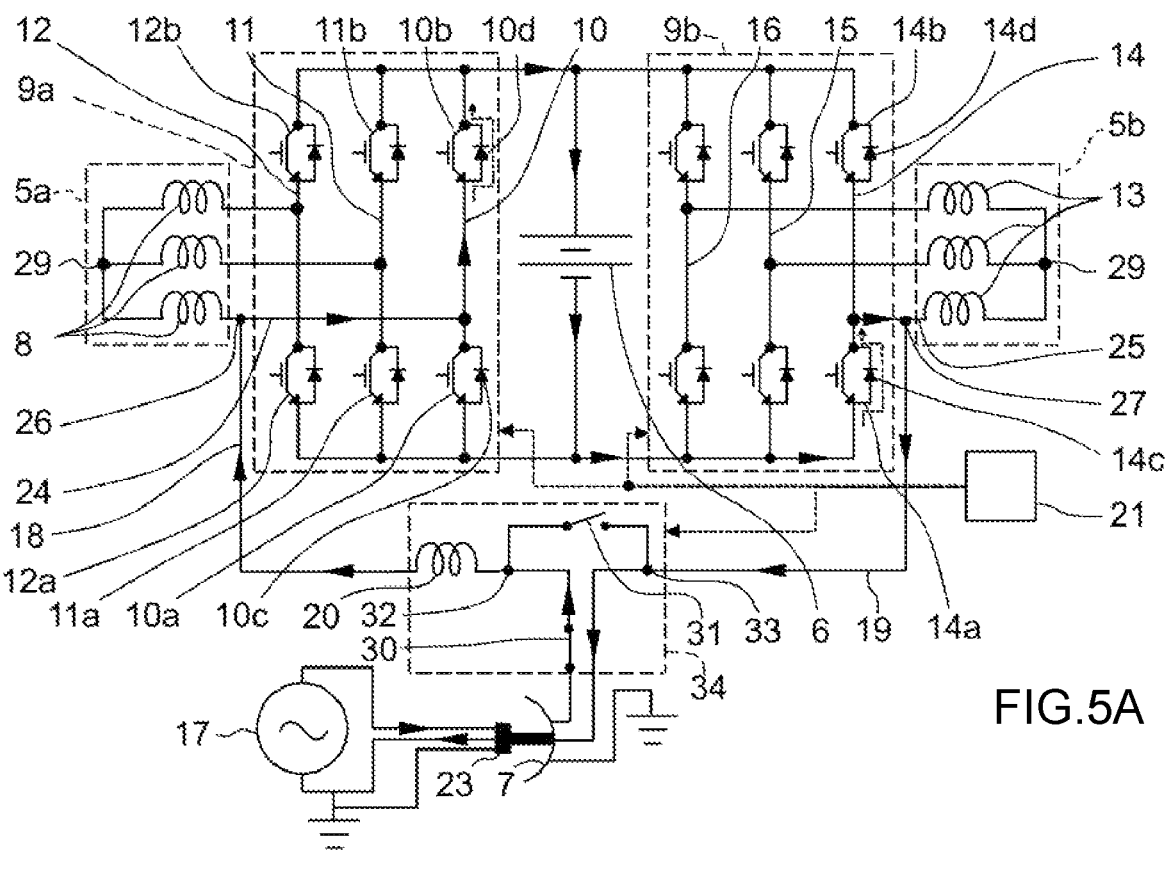
FIG. 5A-5D shows schematically the functionality of the vehicle electrical system of FIG. 4 in step-down mode for both polarities of a single phase AC supply.
Figure 5B:
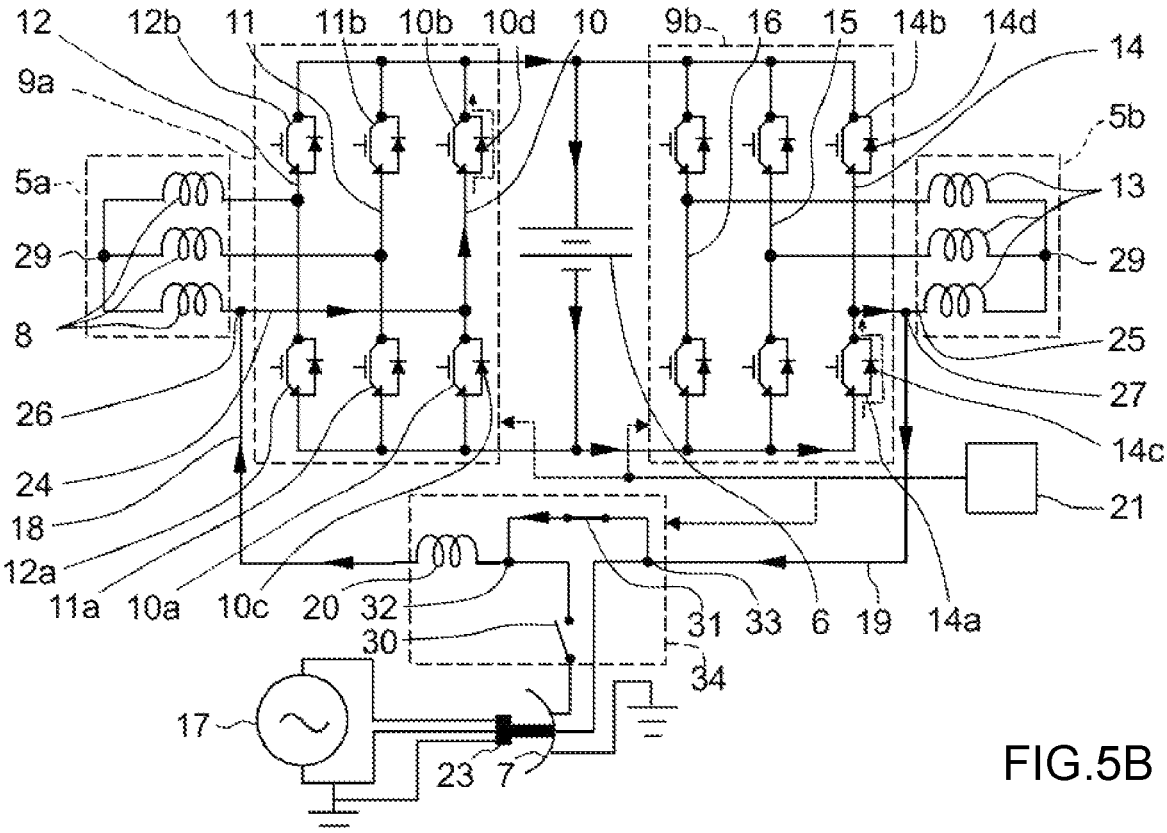
Figure 5C:
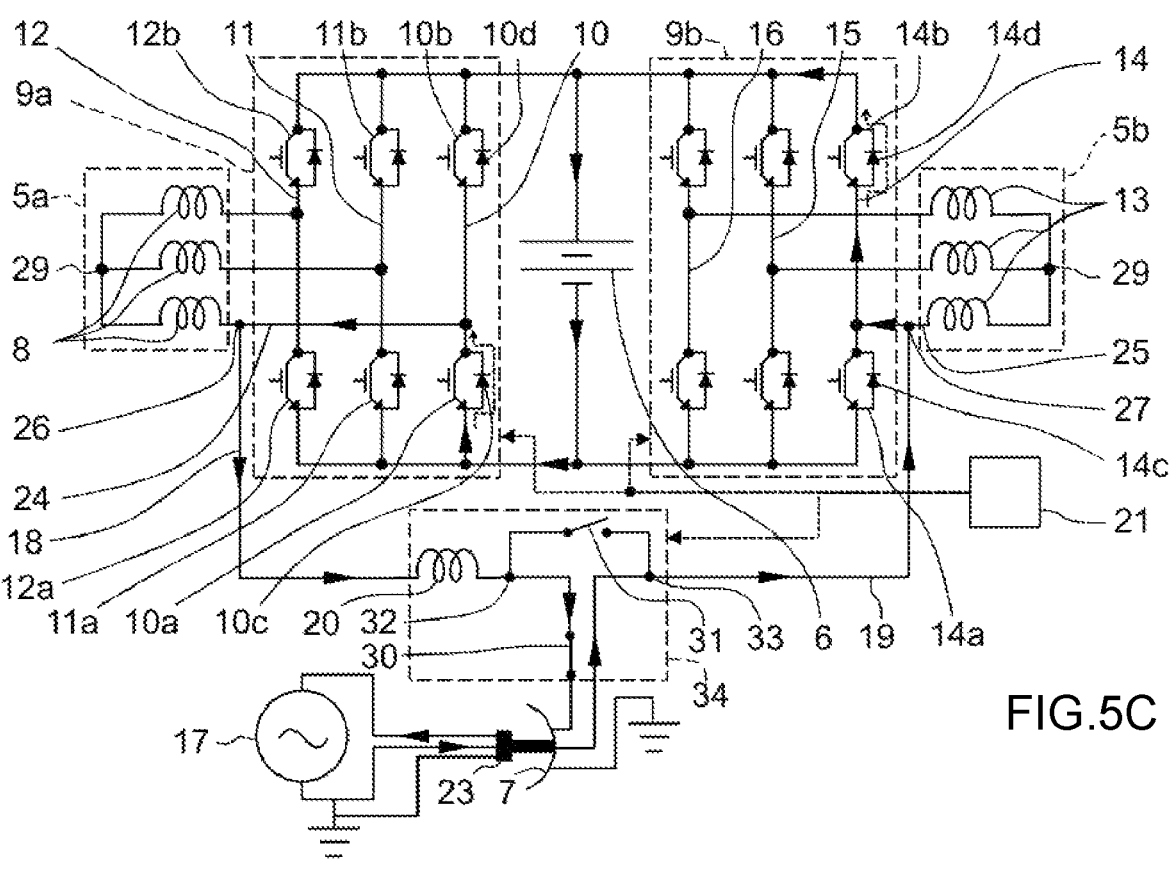
Figure 5D:
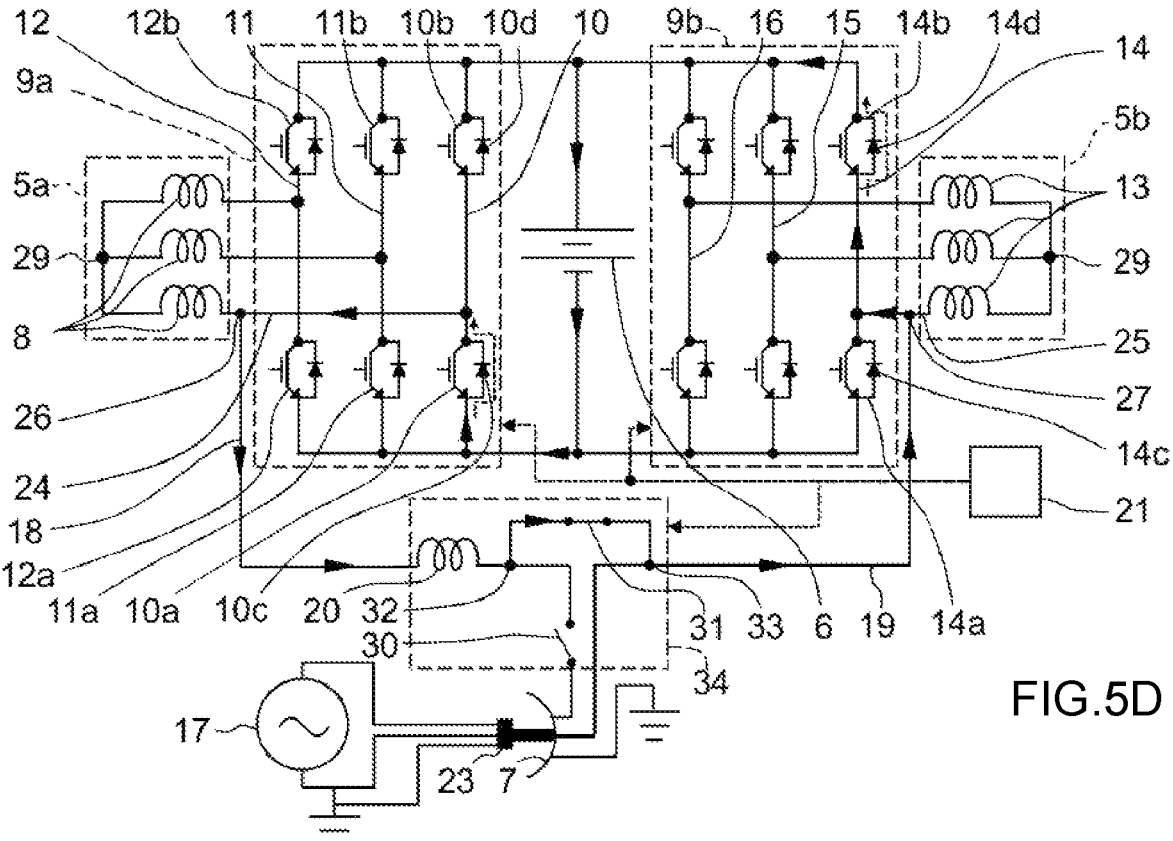

One example embodiment of operation of the vehicle electrical system of FIG. 4 in voltage step-down mode will however be described in detail below with reference to FIGS. 5A-5D, wherein FIGS. 5A and 5B shows the vehicle electrical system in a first supply voltage polarity state and FIGS. 5C and 5D shows the vehicle electrical system in a second supply voltage polarity state.

Generally, when the control system 21 is configured for charging the electrical storage system 6 using electrical energy supplied from the vehicle external charging source 17 in a voltage step-down mode, the control system 21 is configured to operate the first supply switch 30 and the step-down switch 31 synchronized and with alternating on and off periods.

Moreover, when the control system 21 is configured for charging the electrical storage system 6 using electrical energy supplied from the vehicle external charging source 17 in a voltage step-down mode, the control system 21 is configured to set the first supply switch 30 in a closed state when the step-down switch 31 is set in an open state, and oppositely.

More in detail, with reference to FIG. 5A, when the control system 21 of the vehicle electrical system is configured for charging the electrical storage system 6 using electrical energy supplied from the vehicle external charging source 17 in a voltage step-down mode during a first supply voltage polarity state, the control system 21 is configured to operate the first supply switch 30 and the step-down switch 31, such that a charging current during an on-period of the first supply switch 30 flows from a negative pole of the electrical storage system 6, through the intrinsic or extrinsic reverse diode 14*c* associated with a first switch 14*a* of the first switch leg 14 of the second inverter 9*b*, the second conductive line 19, the vehicle external charging source 17, the first conductive line 18 including the first inductor 20, an intrinsic or extrinsic reverse diode 10*d* associated with a second switch 10*b* of the first switch leg 10 of the first inverter 9*a*, and to a positive pole of the electrical storage system 6.

During said on-period of the first supply switch 30, a charging current will start from zero and begin to increase. However, the first inductor will produce an opposing voltage across its terminals in response to the increasing charging current. This voltage drop over first inductor counteracts the voltage of the vehicle external charging source 17 and therefore reduces the net voltage across the electrical storage system 6, such that the desired step-down voltage is provided. Over time, the rate of change of charging current decreases and so does the voltage across the first inductor, thereby resulting in increased charging voltage over the electrical storage system 6. During this time, the first inductor stores energy in the form of a magnetic field.

After a short time period, depending on the voltage level of the vehicle external charging source 17 and the desired charging voltage level over the electrical storage system 6, the first supply switch 30 will open and the step-down switch will close, i.e. the on-period of the first supply switch 30 ends and the on-period of the step-down switch begins.

Consequently, as illustrated in FIG. 5B, when the control system 21 is configured for charging the electrical storage system 6 using electrical energy supplied from the vehicle external charging source 17 in a voltage step-down mode, the control system 21 is configured to operate the first supply switch 30 and the step-down switch 31, such that a charging current during an on-period of the step-down switch 31 flows from the negative pole of the electrical storage system 6, through the intrinsic or extrinsic reverse diode 14c associated with a first switch 14a of the first switch leg 14 of the second inverter 9b, the second conductive line 19, the step-down switch 31 in a closed state, the first conductive line 18 including the first inductor 20, an intrinsic or extrinsic reverse diode 10d associated with a second switch 10b of the first switch leg 10 of the first inverter 9a, and to a positive pole of the electrical storage system 6.

In other words, when the first supply switch 30 is opened and the step-down switch 31 is closed, the external voltage source 17 will be disconnected from the charging circuit and the charging current will start to decrease. However, the decreasing current will produce a voltage drop across the first inductor caused by the sinking stored energy in the inductor's magnetic field, such that the first inductor becomes current source driving a continued charging current. With time, the voltage drop of the first inductor become smaller and the charging current sinks.

The duty cycle of the first supply switch 30, as for example accomplished by appropriate pulse width modulation of the first supply switch 30, thus determines the resulting charging voltage level.

The two step-down switching states described above with reference to FIGS. 5A and 5B, respectively, are both performed while having the vehicle external charging source 17 supplying electrical power having the supply voltage polarity state relate, such as DC supply. However, since the step-down switching operation merely relate to appropriate switching of the first supply switch 30 and the step-down switch 31, while all switches of the first and second inverters 9a, 9b may be in a constant open state, the above-described switching operation showed in FIGS. 5A and 5B apply for both supply voltage polarity states.

Consequently, when the control system 21 is configured for charging the electrical storage system 6 using AC electrical energy supplied from the vehicle external charging source 17 in a voltage step-down mode, the control system 21 is configured to operate the first supply switch 30 and the step-down switch 31, such that a charging current alternates between: flowing through the intrinsic or extrinsic reverse diode 10d associated with a second switch 10b of the first switch leg 10 of the first inverter 9a and an intrinsic or extrinsic reverse diode 14c associated with a first switch 14a of the first switch leg 14 of the second inverter 9b for charging the electrical storage system during a first supply voltage polarity state; and flowing through the intrinsic or extrinsic reverse diode 14d associated with a second switch 14b of the first switch leg 14 of the second inverter 9b and an intrinsic or extrinsic reverse diode 10c associated with a first switch 10a of the first switch leg 10 of the first inverter 9a for charging the electrical storage system 6 during a second supply voltage polarity state.

Clearly, when the control system 21 is configured for charging the electrical storage system 6 using electrical energy supplied from the vehicle external charging source 17 in a voltage step-down mode, the control system 21 is configured to keep all switches of the first and second inverters 9a, 9b in an open state, i.e. non-conductive state.

Many minor amendments may be made to the principle design of the vehicle electrical system. For example, with reference to FIG. 6, the vehicle electrical system may additionally comprise a second inductor 35, wherein the first inductor 20 is arranged in one of the first and second conductive lines 18, 19, and the second inductor 35 is arranged in the other of the first and second conductive lines 18, 19. Moreover, the vehicle electrical system may additionally comprise a second supply switch 36, wherein the first supply switch 30 is arranged in one of the first and second conductive lines 18, 19, and the second first supply switch 36 is arranged in the other of the first and second conductive lines 18, 19. Specifically, the second supply switch 30 may be arranged in the first conductive line 18 at a location between the first coupling point 32 and the terminal 7, or in the second conductive line 19 at a location between the second coupling point 33 and the terminal 7.

Consequently, according to some example embodiments, the terminal 7 is configured for receiving single-phase AC from the vehicle external charging source 17, wherein the vehicle electrical system comprises a first supply switch 30 arranged in the first conductive line 18 and configured for selectively opening and closing said first conductive line 18, and a second supply switch 36 arranged in the second conductive line 19 and configured for selectively opening and closing said second conductive line 19. The opening and closing of the first and second supply switches 30, 36 is preferably, but not strictly necessary, synchronized and identical, i.e. opening and closing at the same time.

The example embodiments of the vehicle electrical system described above are configured for being supplied with DC or single phase AC from the vehicle external charging source 17 for charging of the electrical storage system 6. However, in certain applications is may be desirable to charge the electrical storage system with three-phase AC from the vehicle external charging source 17. Such an example embodiment is schematically illustrated in FIG. 7, wherein the vehicle external charging source 17 is a three-phase power source connected to the external charging connector 23.

Figures 7, 8:
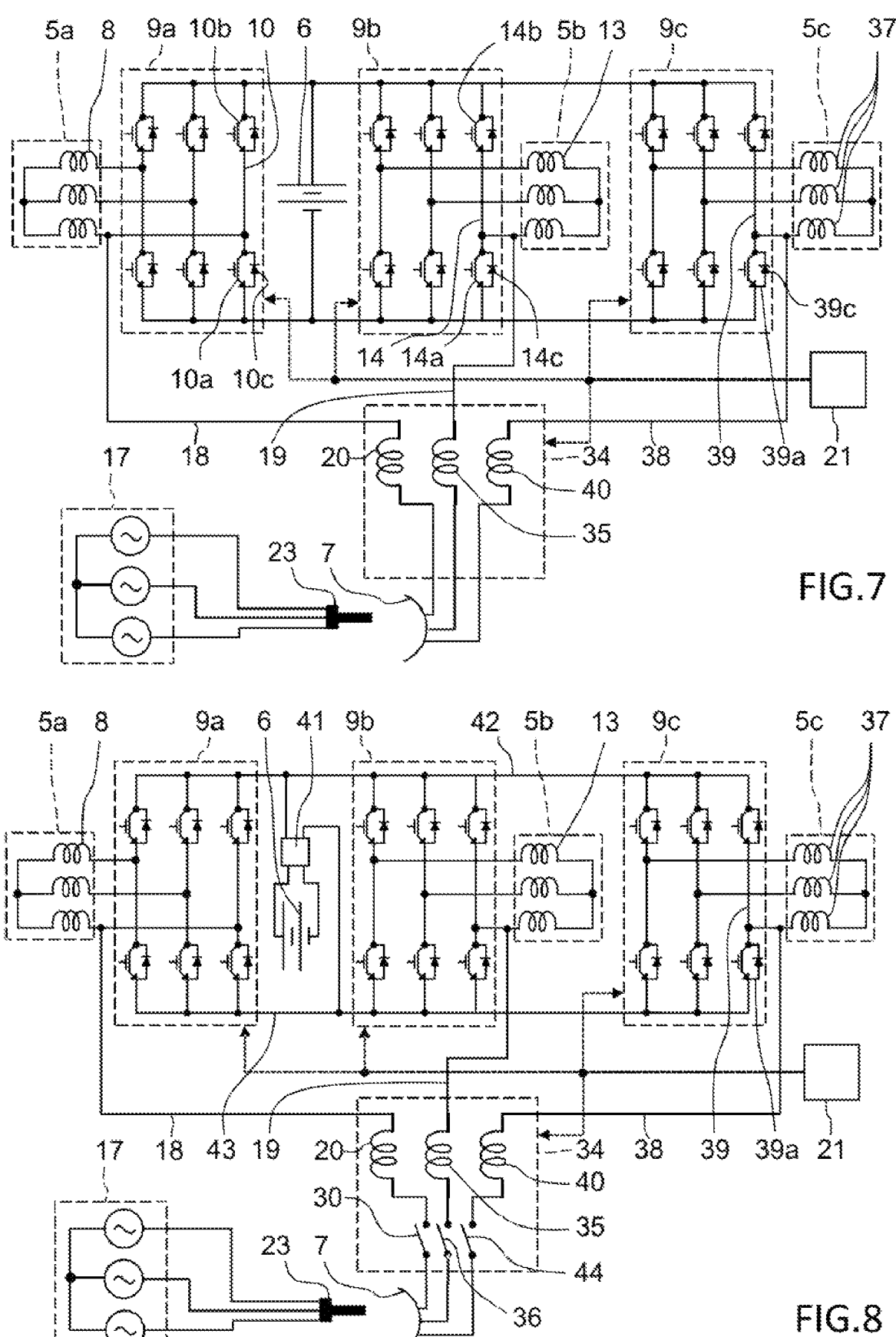
FIG. 7 shows schematically a further example embodiment of the vehicle electrical system configured for being charged with three-phase AC according to the disclosure.
FIG. 8 shows schematically a further example embodiment of the vehicle electrical system according to the disclosure.

The vehicle electrical system of FIG. 7 is essentially identical with the vehicle electrical system described with reference to FIG. 2, but with an additional, third inverter 9c being added in parallel with the first and second inverters 9a, 9b, and with a third multiphase electrical machine 5c having a plurality of stator windings being connected to the third inverter 9c.

Consequently, the vehicle electrical system of FIG. 7 comprises, in addition to the features described with reference to FIG. 2, a third multiphase electrical machine 5c having a plurality of stator windings 37, a third inverter 9c connected to the electrical storage system 6 and to the third multiphase electrical machine 5c, wherein the third inverter 9c has a plurality of switch legs with switches, a third conductive line 38 connecting a third pole of the terminal 7 with a first switch leg 39 of the third inverter 9*c*, a second inductor 35 arranged in the second conductive line 19, a third inductor 40 arranged in the third conductive line 38, wherein the first inductor 20 is arranged in the first conductive line 18, and wherein the control system 21 is operatively coupled to each of the first, second and third inverters 9*a*, 9*b*, 9*c* and configured for controlling operation of the switches of the first, second and third inverters 9*a*, 9*b*, 9*c* for preventing charging current from passing through any of the stator windings 8, 13, 37 of the first, second and third multiphase electrical machines 5*a*, 5*b*, 5*c* during three-phase charging of the electrical storage system from the vehicle external charging source.

The vehicle electrical system of FIG. 7 may be controlled by the control system 21 to operate in a voltage step-up mode, similar to the vehicle electrical system described with reference to FIGS. 3A-3D. In detail, when the control system 21 is configured for charging the electrical storage system 6 of FIG. 7 using electrical energy supplied from the three-phase vehicle external charging source 17 in a voltage step-up mode, the control system 21 is configured to operate each of the first switch 10*a* of the first switch leg 10 of the first inverter 9*a*, the first switch 14*a* of the first switch leg 14 of the second inverter 9*b*, and a first switch 39*a* of the first switch leg 39 of the third inverter 9*c* consecutively and with alternating on and off periods. Specifically, each of said first switches 10*a*, 14*a*, 39*a* is controlled to operate with alternating on and off periods as long as operating in a positive supply voltage polarity state of the AC supply. During the subsequent negative supply voltage polarity state of the AC supply to each of said first switches 10*a*, 14*a*, 39*a*, the first switches 10*a*, 14*a*, 39*a* may be in an open state and charging current flows in opposite direction through the intrinsic or extrinsic reverse diode 10*c*, 14*c*, 39*c* associated with each of said first switches 10*a*, 14*a*, 39*a*, as described by analogy with reference to FIGS. 3A-3D.

If voltage step-down is desired for charging of the electrical storage system when being supplied with three-phase AC, an isolated or non-isolated DC/DC converter 41 may be arranged between the positive rail and the negative rail of the DC bus of the vehicle electrical system and the electrical storage system 6, as schematically illustrated in FIG. 8.

Moreover, as also shown in FIG. 8, the vehicle electrical system may additionally include first, second and third supply switches in the first, second and third conductive lines 18, 19, 44, respectively.

Figures 6, 9:
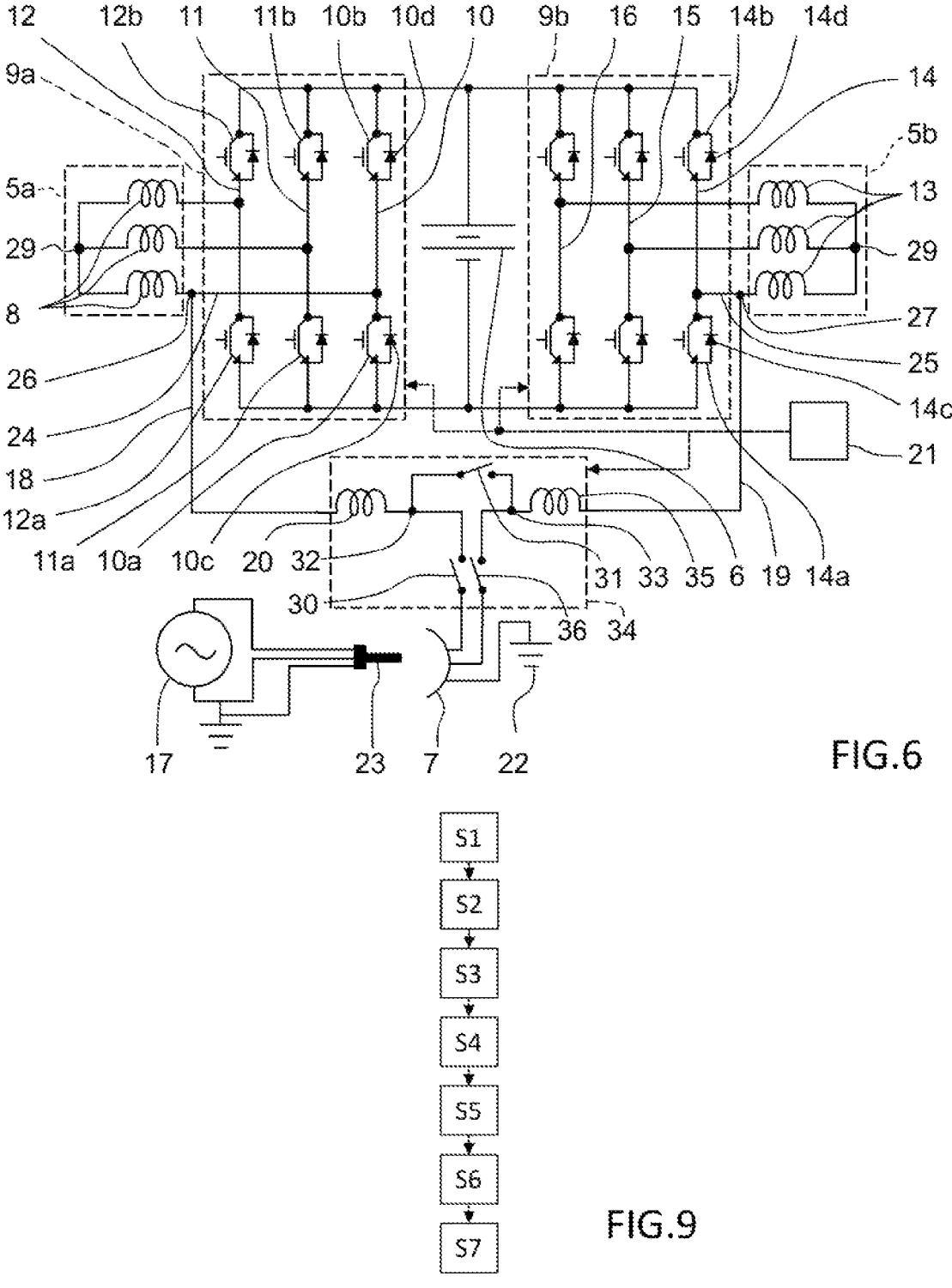
FIG. 6 shows schematically a further example embodiment of the vehicle electrical system according to the disclosure.
FIG. 9 shows schematically the basic method steps of a method for charging the electrical storage system.

The disclosure also relates to method for charging an electrical storage system of a vehicle electrical system, as described with reference to FIG. 2, 3A-3D or 7. With reference to FIG. 9, which shows the basic steps, the method comprises a first step S1 of connecting a first inverter 9*a* to a first multiphase electrical machine 5*a* having a plurality of stator windings 8 and to the electrical storage system 6, wherein the first inverter 9*a* has a plurality of switch legs 10, 11, 12 with switches. The method further comprises a second step S2 of connecting a second inverter 9*b* to a second multiphase electrical machine 5*b* having a plurality of stator windings 13 and to the electrical storage system 6, wherein the second inverter 9*b* has a plurality of switch legs 14, 15, 16 with switches. The method additionally includes a third step S3 of connecting a first pole of a terminal 7 with a first switch leg 10 of the first inverter 9*a* via a first conductive line 18, and a fourth step S4 of connecting a second pole of the terminal 7 with a first switch leg 14 of the second inverter 9*b* via a second conductive line 19. The method then further comprises a fifth step S5 of providing a first inductor 20 in one of the first and second conductive lines 18, 19, and sixth step S6 of connecting the terminal 7 having a plurality of poles to a vehicle external charging source 17 configured for supplying single-phase AC or multi-phase AC or DC, and finally a seventh step S7 of controlling operation of the switches 10*a*, 14*a* of the first and second inverters 9*a*, 9*b* for preventing charging current from passing through any of the stator windings 8, 13 of the first and second multiphase electrical machines 5*a*, 5*b* during transfer of electrical charge from the vehicle external charging source 17 to the electrical storage system 6.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. For example, some of the method steps of the method described above with reference to FIG. 9 may be performed in another order than the order described. For example, each of steps S1-S6 may be performed in essentially any internal order. Hence, the methods discussed are merely one embodiment of the present disclosure as contemplated, and the skilled person understands that the order of connection of parts is not essential for the functioning of the method for charging an electrical storage system.

Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

What is claimed is:

1. A vehicle electrical system comprising:

an electrical storage system, a first multiphase electrical machine having a plurality of stator windings, a first inverter connected to the electrical storage system and to the first multiphase electrical machine, wherein the first inverter has a plurality of switch legs with switches, a second multiphase electrical machine having a plurality of stator windings, a second inverter connected to the electrical storage system and to the second multiphase electrical machine, wherein the second inverter has a plurality of switch legs with switches, a terminal having a plurality of poles and configured for receiving single-phase AC or multi-phase AC or DC from a vehicle external charging source, a first conductive line connecting a first pole of the terminal with a first switch leg of the first inverter, a second conductive line connecting a second pole of the terminal with a first switch leg of the second inverter, a first inductor arranged in one of the first and second conductive lines, and a control system operatively coupled to the first and second inverters and configured for controlling operation of the switches of the first and second inverters for preventing charging current from passing through any of the stator windings of the first and second multiphase electrical machines during transfer of electrical charge from the vehicle external charging source to the electrical storage system.

2. The vehicle electrical system according to claim 1, wherein when the control system is configured for charging the electrical storage system using electrical energy supplied from the vehicle external charging source in a voltage step-up mode, the control system is configured to operate a first switch of the first switch leg of the first inverter with alternating on and off periods, such that a charging current during an on-period flows from the vehicle external charging source, through the first conductive line, the first switch of the first switch leg of the first inverter, an intrinsic or extrinsic reverse diode associated with a first switch of the first switch leg of the second inverter, the second conductive line, the first inductor, and back to the vehicle external charging source, while bypassing the electrical storage system, and such that a charging current during an off-period flows from a negative pole of the electrical storage system, through the intrinsic or extrinsic reverse diode associated with the first switch of the first switch leg of the second inverter, the second conductive line, the first inductor, the vehicle external charging source, the first conductive line, an intrinsic or extrinsic reverse diode associated with a second switch of the first switch leg of the first inverter, to a positive pole of the electrical storage system.

3. The vehicle electrical system according to claim 2, wherein when the vehicle external charging source is AC for charging the electrical storage system in a voltage step-up mode, the control system selectively controls operation of the first switch leg of the first inverter and the first switch leg of the second inverter, such that electric current flow alternates between:

flowing through the first switch of the first switch leg of the first inverter for charging the electrical storage system during a first supply voltage polarity state, and flowing through the first switch of the first switch leg of the second inverter for charging the electrical storage system during a second supply voltage polarity state.

4. The vehicle electrical system according to claim 1, wherein the vehicle electrical system further comprises:

a first supply switch arranged in one of the first and second conductive lines and configured for selectively opening and closing said first or second conductive line, and a step-down switch operatively connected to the first and second conductive lines and configured for selectively opening and closing a connection between said first or second conductive lines, wherein the first supply switch, the step-down switch and the first inductor are arranged to allow current flow between a portion of the first conductive line and a portion of the second conductive line via the step-down switch and the first inductor when the first supply switch is in an open state.

5. The vehicle electrical system according to claim 4, wherein when the control system is configured for charging the electrical storage system using electrical energy supplied from the vehicle external charging source in a voltage step-down mode, the control system is configured to operate the first supply switch and the step-down switch synchronized and with alternating on and off periods.

6. The vehicle electrical system according to claim 4, wherein when the control system is configured for charging the electrical storage system using electrical energy supplied from the vehicle external charging source in a voltage step-down mode, the control system is configured to set the first supply switch in a closed state when the step-down switch is set in an open state, and oppositely.

7. The vehicle electrical system according to claim 4, wherein when the control system is configured for charging the electrical storage system using electrical energy supplied from the vehicle external charging source in a voltage step-down mode, the control system is configured to keep all switches of the first and second inverters in an open state.

8. The vehicle electrical system according to claim 4, wherein when the control system is configured for charging the electrical storage system using electrical energy supplied from the vehicle external charging source in a voltage step-down mode, the control system is configured to operate the first supply switch and the step-down switch, such that a charging current during an on-period of the first supply switch flows from a negative pole of the electrical storage system, through the intrinsic or extrinsic reverse diode associated with a first switch of the first switch leg of the second inverter, the second conductive line, the first inductor, the vehicle external charging source, the first conductive line, an intrinsic or extrinsic reverse diode associated with a second switch of the first switch leg of the first inverter, and to a positive pole of the electrical storage system.

9. The vehicle electrical system according to claim 4, wherein when the control system is configured for charging the electrical storage system using electrical energy supplied from the vehicle external charging source in a voltage step-down mode, the control system is configured to operate the first supply switch and the step-down switch, such that a charging current during an on-period of the step-down switch flows from a negative pole of the electrical storage system, through the intrinsic or extrinsic reverse diode associated with a first switch of the first switch leg of the second inverter, the second conductive line, the first inductor, the step-down switch, the first conductive line, an intrinsic or extrinsic reverse diode associated with a second switch of the first switch leg of the first inverter, and to a positive pole of the electrical storage system.

10. The vehicle electrical system according to claim 4, wherein when the control system is configured for charging the electrical storage system using AC electrical energy supplied from the vehicle external charging source in a voltage step-down mode, the control system is configured to operate the first supply switch and the step-down switch, such that a charging current alternates between:

flowing through the intrinsic or extrinsic reverse diode associated with a second switch of the first switch leg of the first inverter and an intrinsic or extrinsic reverse diode associated with a first switch of the first switch leg of the second inverter for charging the electrical storage system during a first supply voltage polarity state, and flowing through the intrinsic or extrinsic reverse diode associated with a second switch of the first switch leg of the second inverter and an intrinsic or extrinsic reverse diode associated with a first switch of the first switch leg of the first inverter for charging the electrical storage system during a second supply voltage polarity state.

11. The vehicle electrical system according to claim 1, wherein when the control system is configured for charging the electrical storage system using electrical energy supplied from the vehicle external charging source in a voltage step-up mode, the control system is configured for controlling operation of the switches of the first and second inverters by operating a first switch of the first switch leg of the first inverter with alternating on and off periods, while the other switches of the first and second inverters are controlled to remain in the open state for preventing charging current from passing through any of the stator windings of the first and second multiphase electrical machines, and/or wherein when the control system is configured for charging the electrical storage system using electrical energy supplied from the vehicle external charging source in a voltage step-down mode, the control system is configured for controlling operation of the switches of the first and second inverters by keeping all switches of the first and second inverters in an open state for preventing charging current from passing through any of the stator windings of the first and second multiphase electrical machines.

12. The vehicle electrical system according to claim 1, wherein the vehicle electrical system further comprises:

a third multiphase electrical machine having a plurality of stator windings, a third inverter connected to the electrical storage system and to the third multiphase electrical machine, wherein the third inverter has a plurality of switch legs with switches, a third conductive line connecting a third pole of the terminal with a first switch leg of the third inverter, a second inductor arranged in the second conductive line, a third inductor arranged in the third conductive line, wherein the first inductor is arranged in the first conductive line, and wherein the control system operatively coupled to each of the first, second and third inverters and configured for controlling operation of the switches of the first, second and third inverters for preventing charging current from passing through any of the stator windings of the first, second and third multiphase electrical machines during three-phase charging of the electrical storage system from the vehicle external charging source.

13. Method for charging an electrical storage system of a vehicle electrical system, the method comprising:

connecting a first inverter to a first multiphase electrical machine having a plurality of stator windings and to the electrical storage system, wherein the first inverter has a plurality of switch legs with switches, connecting a second inverter to a second multiphase electrical machine having a plurality of stator windings and to the electrical storage system, wherein the second inverter has a plurality of switch legs with switches, connecting a first pole of a terminal with a first switch leg of the first inverter via a first conductive line, connecting a second pole of the terminal with a first switch leg of the second inverter via a second conductive line, providing a first inductor in one of the first and second conductive lines, connecting the terminal having a plurality of poles to a vehicle external charging source configured for supplying single-phase AC or multi-phase AC or DC, and controlling operation of the switches of the first and second inverters for preventing charging current from passing through any of the stator windings of the first and second multiphase electrical machines during transfer of electrical charge from the vehicle external charging source to the electrical storage system.

14. The method according to claim 13, wherein when charging the electrical storage system using electrical energy supplied from the vehicle external charging source in a voltage step-up mode, operating a first switch of the first switch leg of the first inverter with alternating on and off periods, such that a charging current during an on-period flows from the vehicle external charging source, through the first conductive line, the first switch of the first switch leg of the first inverter, an intrinsic or extrinsic reverse diode associated with a first switch of the first switch leg of the second inverter, the second conductive line, the first inductor, and back to the vehicle external charging source, while bypassing the electrical storage system, and such that a charging current during an off-period flows from a negative pole of the electrical storage system, through the intrinsic or extrinsic reverse diode associated with the first switch of the first switch leg of the second inverter, the second conductive line, the first inductor, the vehicle external charging source, the first conductive line, an intrinsic or extrinsic reverse diode associated with a second switch of the first switch leg of the first inverter, to a positive pole of the electrical storage system.

15. The method according to claim 13, further comprising:

providing a first supply switch in one of the first and second conductive lines and configured for selectively opening and closing said first or second conductive line, and providing a step-down switch operatively connected to the first and second conductive lines and configured for selectively opening and closing a connection between said first or second conductive line, wherein the first supply switch, the step-down switch and the first inductor are arranged to allow current flow between a portion of the first conductive line and a portion of the second conductive line via the step-down switch and the first inductor when the first supply switch is in an open state.

16. The method according to claim 15, further comprising charging the electrical storage system using electrical energy supplied from the vehicle external charging source in a voltage step-down mode by operating the first supply switch and the step-down switch, such that a charging current during an on-period of the first supply switch flows from a negative pole of the electrical storage system, through the intrinsic or extrinsic reverse diode associated with a first switch of the first switch leg of the second inverter, the second conductive line, the first inductor, the vehicle external charging source, the first conductive line, an intrinsic or extrinsic reverse diode associated with a second switch of the first switch leg of the first inverter, and to a positive pole of the electrical storage system, and a charging current during an on-period of the step-down switch flows from a negative pole of the electrical storage system, through the intrinsic or extrinsic reverse diode associated with a first switch of the first switch leg of the second inverter, the second conductive line, the first inductor, the step-down switch, the first conductive line, an intrinsic or extrinsic reverse diode associated with a second switch of the first switch leg of the first inverter, and to a positive pole of the electrical storage system.

17. The method according to claim 13, wherein when charging the electrical storage system using electrical energy supplied from the vehicle external charging source in a voltage step-up mode, controlling operation of the switches of the first and second inverters by operating a first switch of the first switch leg of the first inverter with alternating on and off periods, while the other switches of the first and second inverters are controlled to remain in the open state for preventing charging current from passing through any of the stator windings of the first and second multiphase electrical machines, and/or wherein when charging the electrical storage system using electrical energy supplied from the vehicle external charging source in a voltage step-down mode, controlling operation of the switches of the first and second inverters by keeping all switches of the first and second inverters in an open state for preventing charging current from passing through any of the stator windings of the first and second multiphase electrical machines.

\* \* \* \* \*